(12) United States Patent
Sugihara et al.

(10) Patent No.: US 6,945,678 B2
(45) Date of Patent: Sep. 20, 2005

(54) ILLUMINATION DEVICE

(75) Inventors: Hiroshi Sugihara, Aichi (JP); Hiroshi Ito, Aichi (JP); Takayuki Kamiya, Aichi (JP); Yoshio Sano, Aichi (JP); Mitsuhiro Nawashiro, Aichi (JP); Kazushi Noda, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/916,607

(22) Filed: Aug. 12, 2004

(65) Prior Publication Data
US 2005/0013139 A1 Jan. 20, 2005

Related U.S. Application Data

(62) Division of application No. 10/305,111, filed on Nov. 27, 2002.

(30) Foreign Application Priority Data

Nov. 28, 2001 (JP) .................................... P2001-363286
Dec. 11, 2001 (JP) .................................... P2001-377181
Jan. 15, 2002 (JP) .................................... P2002-005740
May 17, 2002 (JP) .................................... P2002-143756

(51) Int. Cl.⁷ .............................. B60Q 1/26; B60Q 1/00
(52) U.S. Cl. ...................... 362/490; 362/493; 362/331; 362/237; 362/232; 362/800; 362/494
(58) Field of Search .................................. 362/490, 494, 362/331, 237, 232

(56) References Cited

U.S. PATENT DOCUMENTS

| | | |
|---|---|---|
| 6,331,063 B1 | 12/2001 | Kamada et al. |
| 6,347,880 B1 | 2/2002 | Furst et al. |
| 6,402,354 B1 | 6/2002 | Tatewaki et al. |
| 6,461,024 B1 | 10/2002 | Becker et al. |
| 6,616,313 B2 | 9/2003 | Furst et al. |
| 6,648,490 B2 | 11/2003 | Klose |

Primary Examiner—Thomas M. Sember
Assistant Examiner—James W Cranson
(74) Attorney, Agent, or Firm—McGinn & Gibb, PLLC

(57) ABSTRACT

The invention is directed to provide a vehicle interior illumination device which has a high illuminating effect and which can be used for various kinds of illumination in a vehicle. The illumination device disposed in a roof portion of the interior of a vehicle, including: a first light-emitting section having a first light source constituted by a plurality of first LEDs disposed at substantially regular spaces; and a second light-emitting section having a second light source constituted by a second LED, and a second outer lens with which a light emission side of the second light source is covered and by which light emitted from said second light source is converged and radiated out.

26 Claims, 17 Drawing Sheets

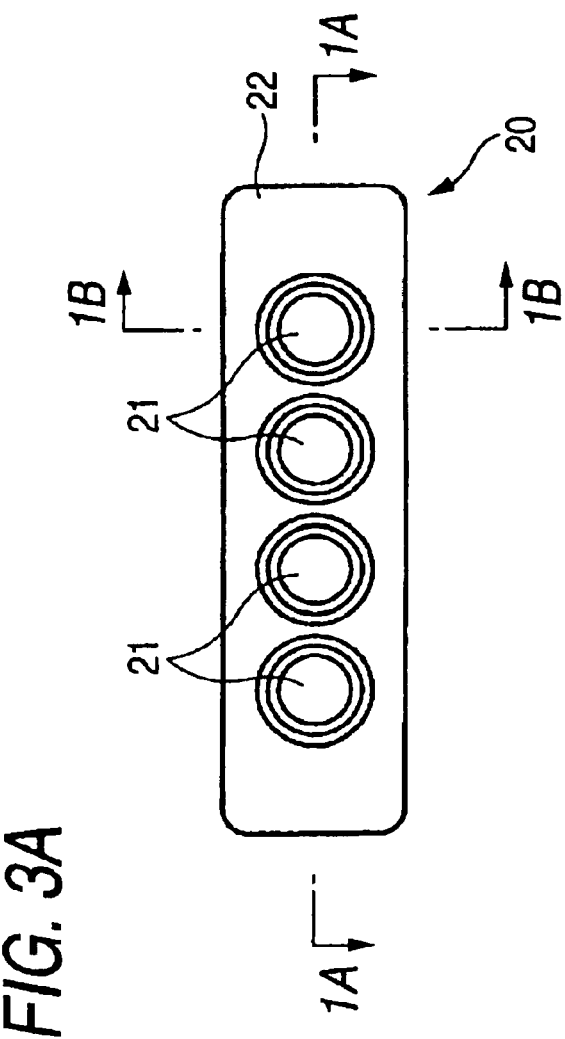
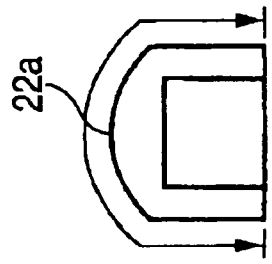
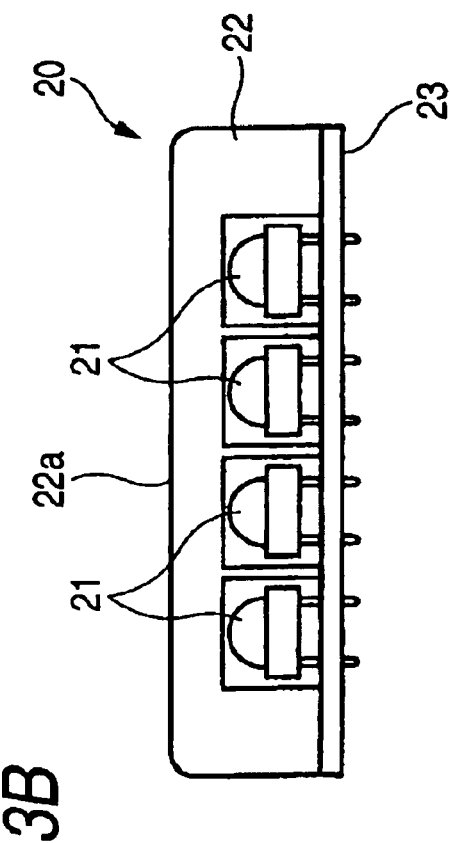
FIG. 3A
FIG. 3B
FIG. 3C

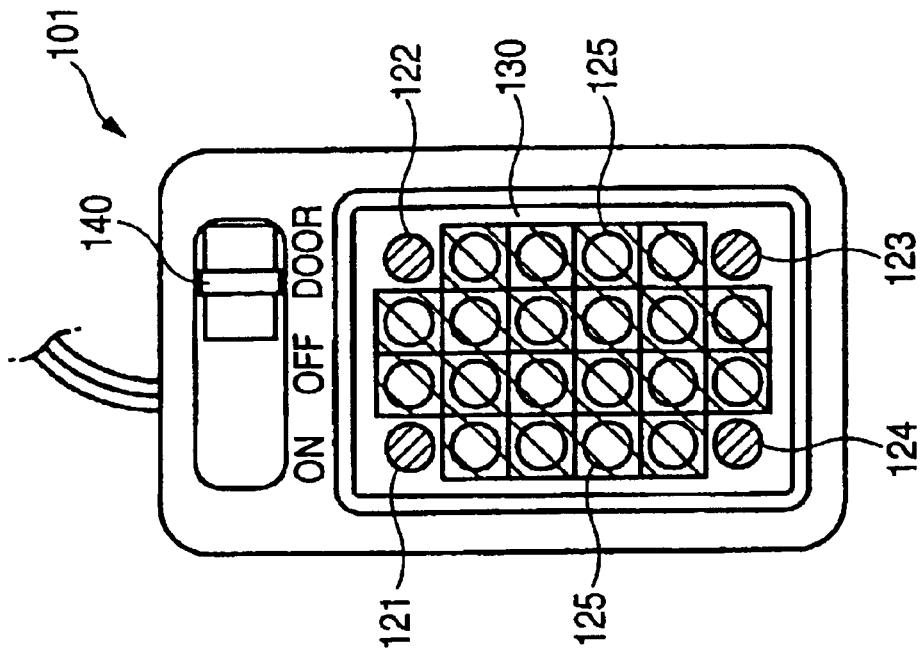
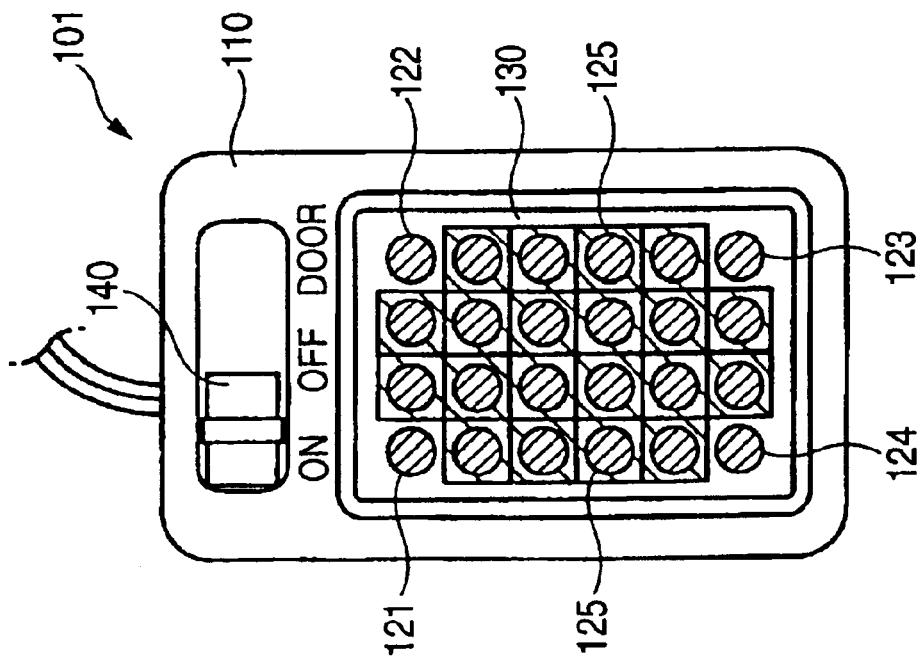

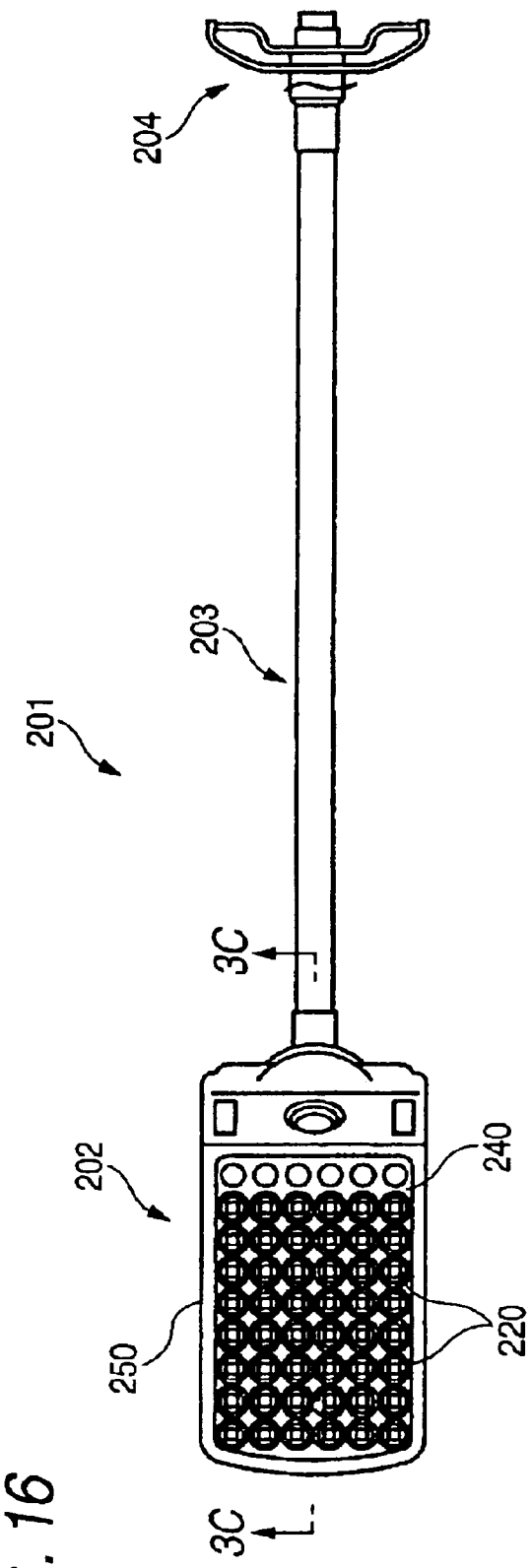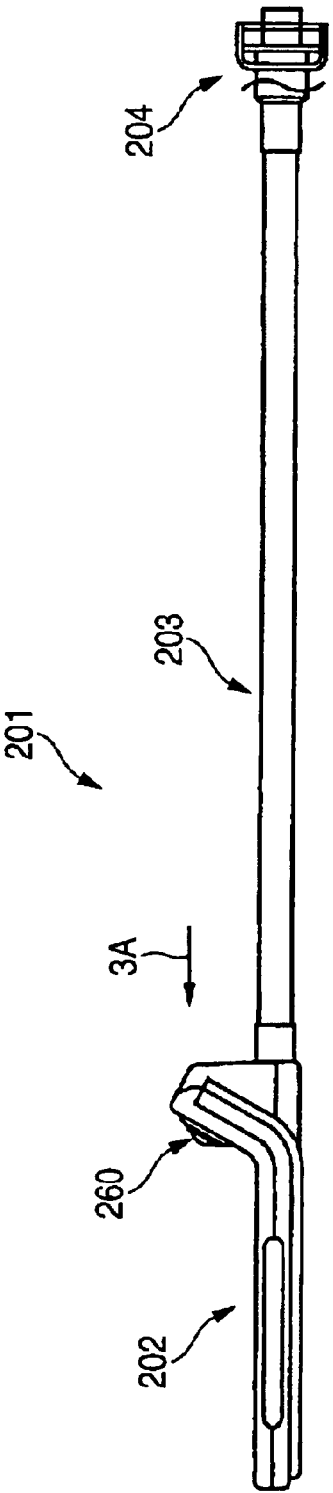
FIG. 16
FIG. 17

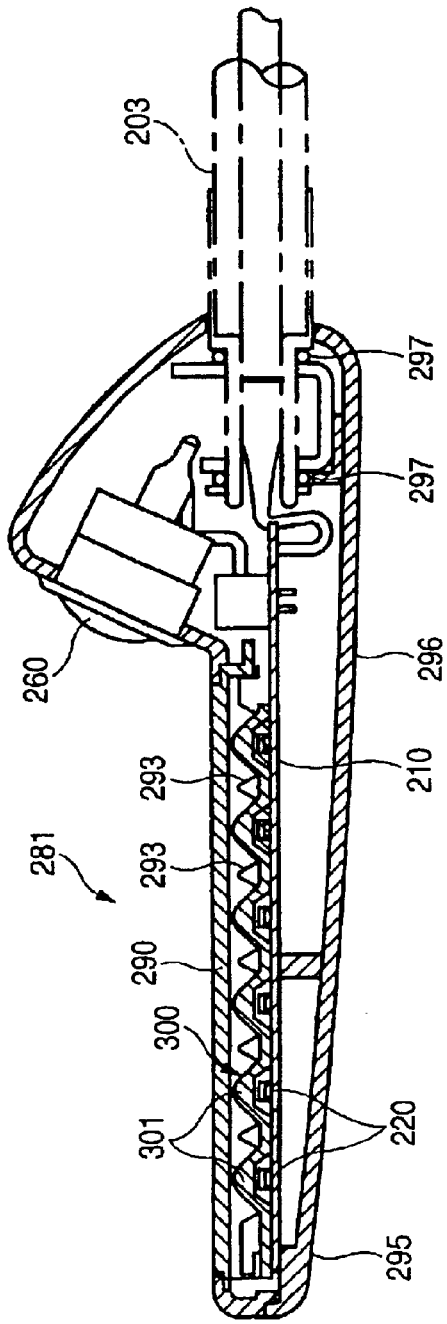
FIG. 25
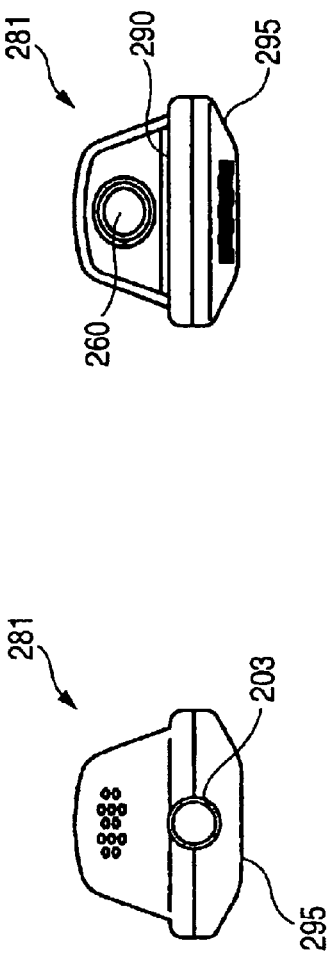
FIG. 27
FIG. 26

ILLUMINATION DEVICE

The present application is a Divisional Application of U.S. patent application Ser. No. 10/305,111 filed on Nov. 27, 2002, which is based on Japanese Patent Applications Nos. 2001-377181, 2001-363286, 2002-005740 and 2002-143756, the entire contents of which are incorporated herein by reference.

BACKGROUND OF THE INVENTION

1. Field of the Invention

The present invention relates to an illumination device for the interior of a vehicle. Particularly, it relates to an illumination device disposed in a roof portion of the interior of a vehicle so as to be used for illuminating the interior of the vehicle or an illumination device provided in the interior of a vehicle, the interior of an airplane or the like, for example, to be used as a reading light for illuminating a place close to occupant's hands.

2. Related Art

For example, in a roof portion of the interior of a vehicle such as a car, an illumination device (room lamp) for illuminating the interior of the vehicle is disposed for the purpose of improving safety when an occupant gets into the vehicle or out of the vehicle in the night or the like. In such an illumination device, a bulb is generally used as a light source. A light-transmissible cover is disposed on the light emission side of the bulb, so that the bulb light illuminates the interior of the vehicle through the cover.

In the related-art configuration, the cover is cut to a desired shape for the purpose of diffusing light. Though light is diffused to a certain degree by the cover, the form of illumination of light depends wholly on the light-emitting characteristic of the bulb. Accordingly, there is an illumination form in which illuminance is high in a place close to the light source (bulb) but becomes lower in a place farther from the light source. That is, illuminance varies widely in an illuminated range. In such an illumination form, it is impossible to grasp the position of a seat accurately or improve visibility at the occupant's step or the like sufficiently though an occupant can roughly grasp the interior of the vehicle when the occupant gets into the vehicle or out of the vehicle in the night or the like.

On the other hand, the directivity of the bulb light is so low that a relatively wide range is illuminated by the light. It is difficult to illuminate a necessary area precisely when an occupant in the passenger seat or in the rear seat needs a light while the vehicle is running. That is, there is fear that the surroundings of the necessary area may be illuminated to make the other occupants in the surroundings feel unpleasant.

Moreover, because the amount of heat generated in the bulb is large, the bulb is unsuitable for continuous use in an ON state for a long time. Hence, the related-art illumination device cannot be used for the purpose requiring long-time illumination, for example, as a reading light in the rear seat. The purpose of use of the related-art illumination device is therefore restricted within a narrow range.

Moreover, the illumination device heretofore generally used is of the type in which either a state of turning on the bulb (illumination state) or a state of turning off the bulb (non-illumination state) is selected automatically with the operation of a switch or with the opening/closing of any door. Hence, the form of illumination by the related-art illumination device is monotonous.

As described above, in the related-art illumination device using a bulb as a light source, there is room for improvement in the illuminating effect. In addition, when the bulb is used, it is undesirable that ambient parts (such as a cover) are disposed in proximity to the bulb because of the large amount of heat generated in the bulb switched on. This is a cause of hindrance to reduction in size.

A fluorescent lamp may be used as another light source. It is however necessary to provide a boosting circuit for driving the fluorescent lamp with a high voltage. There is fear that the boosting circuit may generate electric noise or magnetic field to exert influence on ambient parts.

On the other hand, there is a demand for the provision of an illumination device which can effectively illuminate a place close to occupant's hands when the occupant (in the rear seat or in the passenger seat) wants to read a book during the running of the vehicle. In response to the demand, the illumination device is required to be capable of being switched on for a long time without giving an unpleasant feeling to the user or other occupants around the user and without giving influence of heat on peripheral parts and apparatus as well as it is a matter of course that the illumination device is required to bring sufficient illuminance. It is further preferable that the illumination device is compact in consideration of the handling properties of the illumination device and the limited space in the interior of the vehicle. In addition, it is preferable that illumination can be performed by spotlight-like parallel light beams. According to illumination using parallel light beams, a predetermined region can be illuminated by a constant amount of light even in the case where the distance between the illumination device and a subject (e.g., a book) of illumination more or less changes. As a result, lowering of the illuminating effect can be prevented from being caused by vibration through the road surface during the running of the vehicle or by movement of the position of the illumination subject by the occupant himself or herself.

An LED is used spotlight-like illumination as a light source at present.

When the LED is used in place of the bulb or fluorescent lamp, the size of the illumination device can be reduced as well as the illumination device can be switched on for a long time without giving an unpleasant feeling to the user or other occupants around the user and without giving influence of heat on peripheral parts and apparatus. When, for example, a chip type LED is used, it is however impossible to form an illumination device capable of radiating parallel light beams by simply using the LED directly because diffused light is radiated from the LED. On the other hand, when a round type (lamp type) LED is used, it is possible to narrow range light to a certain degree in accordance with the shape of a sealing resin (molding member) but it is not easy to obtain parallel light beams. If parallel light beams are to be obtained, it is necessary to use a sealing member thick in the direction of the optical axis. For this reason, the requirements for reduction in size and thickness of the illumination device cannot be satisfied.

In the present circumstances, the illumination device using an LED is used not for illuminating a relatively wide range (e.g. not for reading) but for illuminating a narrow range (e.g., as a map lamp). The purpose of use of the illumination device using an LED is therefore limited.

SUMMARY OF THE INVENTION

The invention is configured in consideration of the problems. An object of the invention is to provide an illumination device for vehicle, which can effectively illuminate any one of areas to be illuminated. Another object of the invention is to provide an illumination device for vehicle, which can perform continuous illumination so as to be used for a plurality of purposes. A further object of the invention is to provide an illumination device for vehicle, which can fulfill various illumination effects (decorative effects).

A further object of the invention is to provide an illumination device which is small-sized to make setting place of the illumination device easy and which is excellent in design.

To achieve at least one of the foregoing objects, the invention is configured as follows.

That is, the invention provides an illumination device disposed in a roof portion of the interior of a vehicle, including: a first light-emitting section having a first light source constituted by a plurality of first LEDs disposed at substantially regular spaces; and a second light-emitting section having a second light source constituted by a second LED, and a second outer lens with which the light emission side of the second light source is covered and by which light emitted from the second light source is converged and radiated out.

According to this configuration, there can be obtained different illuminating effects between light emitted from the first light-emitting section and light emitted from the second light-emitting section. Because a light source constituted by a plurality of LEDs disposed at substantially regular spaces is used as the light source of the first light-emitting section, light emitted from the light source is formed as a wide range of light. That is, wide-range illumination (e.g., illumination of a seat) can be performed by light emitted from the first light-emitting section. On the other hand, spotlight-like light is radiated from the second light-emitting section because light emitted from the light source of the second light-emitting section is converged by the second outer lens and then radiated out. Such spotlight-like light can be preferably utilized for illuminating a specific region such as something held in occupant's hands or a part of a center console. In this manner, the illumination device configured as described above is provided as an illumination device for wide illumination purposes, by which illumination device both light capable of being used for wide-range illumination and light capable being used for spotlight-like illumination can be radiated selectively.

Moreover, because highly directional LEDs are used in the respective light sources constituting the first and second light-emitting sections, illumination by light emitted from each of the light-emitting sections is little in unevenness of illuminance. Hence, illumination having a high illuminating effect (visibility improving effect) can be performed.

Moreover, because light emitted from the second light source is radiated out through the second outer lens, the form of light radiated out, that is, the form of illumination can be changed if the shape, size or the like of the second outer lens is changed. Hence, various illumination forms can be produced in accordance with the design of the second outer lens, so that appropriate and effective illumination can be performed in accordance with the subject of illumination.

In addition, because the LED used as a light source is small in the amount of heat generated at the time of switching-on, the second outer lens of the second light-emitting section can be disposed in proximity to the LED. As a result, light emitted from the second LED is efficiently led into the second outer lens, so that high-luminance light is radiated from a surface of the second outer lens. Accordingly, illumination by the second light-emitting section is high in illuminance, so that a high illuminating effect can be fulfilled. In addition, the whole size of the illumination device can be reduced, so that there can be obtained an effect such as improvement in the degree of freedom for the setting place, improvement in general-purpose properties, and improvement in design.

The illumination device according to the invention includes a first light-emitting section, and a second light-emitting section. The first light-emitting section has a first light source constituted by a plurality of first LEDs disposed at substantially regular spaces. Preferably, the first light-emitting section further has a first outer lens with which the light emission side of the first light source is covered. In this configuration, light emitted from the first light source is radiated out through the first outer lens. Hence, the form of light radiated out, that is, the form of illumination can be changed if the shape, size or the like of the first outer lens is changed. That is, various illumination forms can be produced in accordance with the design of the first outer lens, so that appropriate and effective illumination can be performed in accordance with the subject of illumination.

Preferably, the first outer lens is disposed in proximity to the first light source. By use of this form of arrangement, light emitted from the first light source can be efficiently led into the first outer lens, so that the amount of light radiated out through the first outer lens increases. As a result, illumination having a high illuminating effect can be performed. In addition, the whole size of the illumination device can be reduced, so that there can be obtained an effect such as improvement in the degree of freedom for the setting place, improvement in general-purpose properties, and improvement in design. Incidentally, because each of the LEDs used as the light source of the first light-emitting section is small in the amount of heat generated at the time of switching-on, the first outer lens can be disposed in proximity to the first light source in the aforementioned manner.

Preferably, a recess is provided on the first light source side (i.e., the side irradiated with light emitted from the first light source) of the first outer lens so that the first LEDs are disposed so as to be enclosed in the recess. This is because light emitted from the first LEDs is more efficiently led into the first outer lens. Recesses equal in number to the first LEDs may be provided in place of the single recess so that the first LEDs are disposed so as to be enclosed in the recesses respectively. In this case, light emitted from each of the first LEDs is led into the first outer lens through a surface of corresponding one of the recesses. Recesses smaller in number than the first LEDs may be provided in place of the single recess so that a plurality of first LEDs are disposed in one recess.

Incidentally, a surface portion of the first outer lens irradiated with light emitted from the first LEDs is preferably planished into a mirror surface so that light emitted from the first LEDs can be efficiently taken in.

The light-radiating surface of the first outer lens is shaped to obtain a desired form of illumination. Preferably, the light-radiating surface is shaped like a convex lens. By use of this shape, light emitted from the first light-emitting section is converged when passing through the first outer lens. As a result, a desired range can be illuminated by spotlight-like light. In a specific example, the light-radiating surface of the first outer lens can be designed so that a nearly elliptical region can be illuminated by light radiated out through the first outer lens. For example, the light illuminating such a nearly elliptical region can be used for illuminating both the driver's seat and the passenger seat simultaneously or illuminating the left and right rear seats simultaneously. Here, the spotlight-like light further has a decorative effect, so that there can be obtained an effect in improving design of the interior of the vehicle.

The light-radiating surface of the first outer lens or the surface of the first outer lens irradiated with light emitted from the first light source may be subjected to a cutting treatment, a light-diffusing treatment or a roughening treatment so that the form of light radiated out through the first outer lens can be changed.

The form of arrangement of the plurality of first LEDs is not particularly limited but an appropriate form can be used in consideration of the subject and range of illumination by light emitted from the first light-emitting section. For example, the plurality of first LEDs may be disposed linearly viewed from the light emission observation plane side. In this form of arrangement, light can be obtained in a broad area so that, for example, light emitted from the first light source can be used for illuminating both the driver's seat and the passenger seat simultaneously. In the case where the first LEDs are disposed linearly, the first LEDs may form a plurality of columns.

The number of the first LEDs used can be decided in comprehensive consideration of the range of illumination, illuminance, and luminance of one first LED per se. For example, the number of the first LEDs is selected to be in a range of from 2 to 10.

The plurality of first LEDs may be configured so that the plurality of first LEDs include at least two LEDs for emitting light in such a manner that light beams radiated out through the first outer lens illuminate substantially one region. If the number of LEDs switched on for illuminating substantially one region is controlled in this configuration, illuminance of not a part but the whole of the illumination region can be adjusted or changed. Hence, when the number of LEDs switched on is controlled, illuminance of the region illuminated by light beams emitted from the LEDs respectively can be changed or adjusted without unevenness of illuminance.

It is preferable that the substantially one region illuminated by the plurality of LEDs is substantially equal to the region illuminated by all the light radiated from the first light-emitting section. In this configuration, when the number of LEDs switched on is controlled, illuminance of the region illuminated by light emitted from the first light-emitting section can be changed without unevenness of illuminance. That is, illuminance of the whole region illuminated by light emitted from the first light-emitting section can be changed without unevenness of illuminance by a simple method of controlling the number of LEDs switched on.

Further, configuration is preferably made so that light beams emitted from all the first LEDs contained in the first light-emitting section are radiated out through the first outer lens to illuminate substantially one region. In this configuration, the change of illuminance as described above can be obtained by a method of switching on/off the first LEDs selectively. That is, illuminance of the region illuminated by light emitted from the first light-emitting section can be controlled on the basis of the number of first LEDs switched on. Accordingly, when, for example, the illumination device has a control unit for selecting either a state of switching on all of the first LEDs or a state of switching on a part of the first LEDs, illuminance of the region illuminated by light emitted from the first light-emitting section can be controlled. In this manner, illuminance of the region illuminated by light emitted from the first light-emitting section can be controlled easily and the illumination device can be simplified in configuration as a whole.

The second light-emitting section has a second light source constituted by a second LED, and a second outer lens by which light emitted from the second light source is converged and radiated out. Highly directional LED light can be further narrowed by use of the second outer lens, so that illumination can be performed by light having higher spotlight characteristic. Preferably, the second outer lens is disposed in proximity to the second light source. When this form of arrangement is used, light emitted from the second light source can be efficiently led into the second outer lens so that the amount of light radiated out through the second outer lens increases. As a result, illumination having a high illuminating effect can be performed.

The light-radiating surface of the second outer lens or the surface of the second outer lens irradiated with the light emitted from the second light source may be subjected to a cutting treatment, a light-diffusing treatment or a roughening treatment so that the form of light radiated out through the second outer lens can be changed.

The second light source may be constituted by a plurality of second LEDs. For example, such a configuration is used for the purpose of increasing the amount of light emitted from the second light-emitting section.

A plurality of second light-emitting sections may be provided. In this case, the second light-emitting sections are preferably configured so that different regions are illuminated by light beams radiated from the second light-emitting sections respectively. According to this configuration, there can be obtained an illumination device in which a plurality of places in the interior of the vehicle can be illuminated by spotlight-like light beams. For example, two second light-emitting sections may be provided so that a place close to the driver's hands and a place close to the assistant driver's hands can be illuminated by light beams emitted from the second light-emitting sections respectively. One second light-emitting section maybe provided additionally so that a part of a center console can be illuminated by light emitted from the second light-emitting section. Further, four second light-emitting sections may be provided so that four occupants in the driver's seat, the passenger seat and the left and right rear seats can use light beams emitted from the second light-emitting sections respectively.

Because electric power consumed by each of the LEDs (first and second LEDs) used as light sources of the first and second light-emitting sections is small, the illumination device according to the invention has an advantage that the consumption of electricity is small. Moreover, because the amount of heat generated in each of the LEDs is small and the life of each of the LEDs is long, each of the LEDs can be switched on continuously for a long time. Long-time illumination can be performed in addition to temporary illumination. Hence, the purpose of illumination is widened. Moreover, because each of the LEDs is small in size, the size and thickness of the illumination device can be reduced as a whole. Hence, the space for mounting the illumination device is reduced, so that the illumination device need not occupy a space in the interior of the vehicle wastefully. Because the illumination device is small-sized, the illumination device is excellent in interior decoration property as well as the degree of freedom for the mount position is enhanced.

The type of LEDs used as the first and second LEDs is not particularly limited. For example, any suitable type such as a round type or a chip type may be used.

The color of light emitted from each of the LEDs is not particularly limited. For example, an LED capable of emitting light at a wavelength in a visible region such as white, red, orange, green or blue may be used. An LED capable of emitting light at a wavelength in an ultraviolet region may be also used. In this case, a fluorescent substance capable of generating fluorescence when excited by light in the ultraviolet region may be used in combination with the LED, so that the fluorescence can be used as illuminating light. For example, such a fluorescent substance may be contained in any outer lens (the first outer lens or the second outer lens) disposed on the emission side of the LED. A layer containing such a fluorescent substance may be provided on a surface of the outer lens.

The fluorescent substance is not particularly limited in kind. Either organic fluorescent substance or inorganic fluorescent substance may be used. When an organic fluorescent substance is used, light of a clear emission color can be obtained. On the other hand, when an inorganic fluorescent substance is used, light of a matte emission color can be obtained. A fluorescent substance having any one of various fluorescent colors may be used. For example, a fluorescent substance having a fluorescent color of red, green or blue as one of the three primary colors of light may be used, or a fluorescent substance having an intermediate color between two of the three primary colors of light may be used. A plurality of fluorescent substances may be used in combination. For example, a red fluorescent substance, a green fluorescent substance and a blue fluorescent substance may be used in mixture.

LEDs different in kind and/or emission color may be used in combination. For example, LEDs different in emission color may be used as the first and second LEDs respectively. In this case, illumination by the first light-emitting section and illumination by the second light-emitting section are performed by light beams different in color respectively, so that a decorative effect can be fulfilled. Further, LEDs different in emission color may be used in combination to form a plurality of first LEDs. On the other hand, when a plurality of second light-emitting sections are provided, LEDs different in emission color may be used as LEDs constituting the second light-emitting sections respectively. In this configuration, illumination can be performed by light of a specific color in accordance with each second light-emitting section. Hence, illumination having a high decorative effect can be performed.

In practical use, the illumination device according to the invention is disposed in a roof portion of the interior of a vehicle. For example, the illumination device used may be disposed in a position of the roof portion between the driver's seat and the passenger seat, or in a position of the roof portion substantially equally distant from the driver's seat, the passenger seat and the rear seats.

Light from the first light-emitting section can be used for illuminating a relatively wide range of a subject such as the driver's and the passenger seats or the rear seats. On the other hand, light from the second light-emitting section can be used for illuminating a relatively narrow range of a subject such as a map, a part of a center console or a place close to occupant's hands.

According to a second aspect of the invention, there is provided an illumination device including: at least one LED; at least one first lens disposed on the light emission side of the LED so that light emitted from the LED is converged by the first lens and radiated through the first lens; and at least one second lens disposed on the light radiation side of the first lens so that the light radiated through the first lens is converged as substantially parallel light beams by the second lens and radiated through the second lens.

In this configuration, the illumination device can be provided as an illumination device which can be switched on for a long time because an LED small in the amount of heat generated at the time of switching on is used as a light source. Moreover, the size of the illumination device can be reduced because the LED is small in size. On the other hand, light emitted from the LED is converted into parallel light beams by the first and second lenses, so that illumination can be performed by the parallel light beams. While reduction in thickness of the illumination device is attained, light emitted from the LED can be efficiently converted into parallel light beams by use of the two lenses.

As in the first aspect of the invention, the type of the LED is not particularly limited in the second aspect of the invention. For example, any type such as a round type or a chip type may be used. Preferably, a chip type LED is used. Because the chip type LED is smaller in size than the round type LED, the size and thickness of the illumination device can be reduced more greatly.

The emission color of the LED is not particularly limited. Preferably, the emission color (wavelength of emitted light) of the LED is selected so that white light can be finally radiated from the illumination device. For example, an LED emitting white light may be used. An LED capable of emitting light to excite a fluorescent substance (e.g., an LED capable of emitting light at a wavelength in an ultraviolet region) may be used so that white light can be obtained by use of the action of the fluorescent substance. When, for example, an LED having an emission color of blue is used in combination with a fluorescent substance which generates fluorescence of a color ranging from yellow to yellowish green when excited by light emitted from the LED, the color of the light emitted from the LED and the color of the fluorescence are mixed with each other so that white light can be obtained.

An LED having light-emitting devices capable of emitting red, green and blue light beams respectively may be used. Light of any color can be obtained in the LED when the on/off actions of the light-emitting devices are controlled individually, as well as the LED can emit white light. Hence, a rich variety of illumination forms can be produced not only by white light but also by light of various colors.

Incidentally, an LED light source capable of emitting light at wavelengths both in the visible region and in the ultraviolet region may be used.

The fluorescent substance may be contained in the first lens and/or the second lens, for example, disposed on the light emission side of the LED. Alternatively, a layer containing the fluorescent substance may be provided on a surface of the first lens, or the like. It is a matter of course that a layer containing the fluorescent substance may be provided separately between the LED and the first lens or between the first lens and the second lens.

The fluorescent substance used is not particularly limited in kind in the second aspect of the invention.

The LED can be used in the condition that the LED is mounted on a board. Preferably, a plurality of LEDs may be used for enlargement of the illumination region, improvement of illuminance, etc. In this case, the form of arrangement of the LEDs is not particularly limited. For example, the LEDs may be arranged linearly or like a circular arc (in the above, the form of arrangement in columns is included). The LEDs may be arranged as a matrix in a predetermined region (such as a rectangular region or a circular region). To illuminate such a predetermined region by light without unevenness of illuminance, the matrix arrangement form may be preferably used.

In another aspect of the invention, two lenses constituted by first and second lenses are used. Use of the two lenses permits reduction in thickness and efficient conversion of light emitted from the LED into parallel light beams. Particularly when a chip type LED is used as a light source, diffused light radiated from the light source can be efficiently converted into parallel light beams.

The first lens is disposed on the light emission side of the LED. Light emitted from the LED and incident onto the first lens is converged by the first lens and radiated out through the first lens. Preferably, the first lens has a recess formed on the LED side so that the LED can be disposed in the recess. This is because light from the LED is efficiently led into the first lens. Particularly when a chip type LED is used, light emitted from the chip type LED is in a so-called diffused state. Hence, when the chip type LED is formed so as to be enclosed in the first lens, light emitted from the chip type LED can be extremely efficiently led into the first lens. Preferably, the first lens is disposed in proximity to the LED so that light can be more efficiently led into the first lens. According to the arrangement form, reduction in thickness can be also attained.

Here may be used a plate-like member (first lens plate) having a first lens portion shaped like a convex lens and formed in a region into which light emitted from the LED is led. The first lens portion is equivalent to the aforementioned first lens. A plurality of convex lens-shaped regions may be provided in the first lens plate to thereby form a plurality of first lens portions. Hence, when a plurality of LEDs are used, it is unnecessary to provide first lenses correspondingly to the number of the LEDs. That is, a first lens plate having a plurality of first lens portions formed correspondingly to the number of LEDs used may be provided. Hence, the resulting illumination device can be simplified in configuration. Further, if a plurality of first lens portions are formed in accordance with the form of arrangement of LEDs in advance, it is unnecessary to set the first lenses while adjusting the positions of the first lenses in accordance with the LEDs. Hence, assembling work can be made easily, so that accuracy in assembling is improved.

The second lens is disposed on the light radiation side of the first lens (or the first lens portion). The second lens operates so that light radiated through the first lens (or the first lens portion) is converged as substantially parallel light beams and then radiated.

Preferably, the second lens is disposed in proximity to the first lens so that light radiated through the first lens is more efficiently led into the second lens. According to this arrangement form, reduction in thickness can be also attained.

Here may be used a plate-like member (second lens plate) having a second lens portion shaped like a convex lens and formed in a region into which light radiated through the first lens (or the first lens portion) is led. The second lens portion is equivalent to the aforementioned second lens. Preferably, the second lens portion operates so that light led into the second lens portion through the first lens portion is converged as substantially parallel light beams and then radiated. According to this configuration, there can be obtained an illumination device which can radiate substantially parallel light beams.

A plurality of convex lens-shaped regions maybe provided in the second lens plate to thereby form a plurality of second lens portions. Hence, when a plurality of LEDs are used, it is necessary to provide second lenses correspondingly to the number of the LEDs. That is, a second lens plate having a plurality of second lens portions formed correspondingly to the number of LEDs used may be provided. Hence, the resulting illumination device can be simplified in configuration. Further, if a plurality of second lens portions are formed in accordance with the form of arrangement of LEDs in advance, it is unnecessary to set second lenses while adjusting the positions of the second lenses in accordance with the LEDs. Hence, assembling work can be made easily, so that accuracy in assembling is improved.

The first lens (or the first lens plate) and the second lens (or the second lens plate) can be produced from a synthetic resin such as polycarbonate, acrylic resin, or epoxy resin, or an inorganic material such as glass.

Preferably, a reflector is provided so that light emitted laterally from the LED is reflected toward the light-extracting direction. When such a reflector is provided, light emitted laterally from the LED can be also utilized as illuminating light. Hence, an effect such as improvement of illuminance, and enlargement of the illumination region can be fulfilled. Preferably, the reflector has such a reflection surface shape that light reflected by the reflector is radiated out as parallel light beams. Preferably, the reflector is disposed in a position where light reflected by the reflector is radiated out without passing through the second lens (or the second lens portion). This positional disposition is set for the purpose of preventing light reflected as parallel light beams by the reflector from being refracted as wide-angle light by the second lens. When, for example, the first lens plate and the second lens plate are used, the reflector can be disposed between the first lens plate and the second lens plate or around the first lens portion. The reflector can be formed from a metal plate or a suitable resin having its surface plated with a metal.

Because an LED as a light source and two kinds of lenses constituted by first and second lenses (or first and second lens portions) are used in this configuration, an illumination device compact and capable of radiating parallel light beams can be provided. In a further aspect of the invention, the following configuration of the illumination device is provided to attain greater reduction in size and simplification in configuration. That is, there is provided an illumination device including: LEDs; a lens plate disposed on the light emission side of the LEDs and having substantially reverse bowl-shaped lens portions in regions in which light beams emitted from the LEDs are led respectively; and a reflector by which light emitted from the LEDs and radiated through circumferential portions of the lens portions is reflected toward the light-extracting direction.

According to this configuration, it is unnecessary to provide two lenses (or two lens plates) per LED, so that greater reduction in thickness and size can be attained. At the same time, the illumination device can be simplified in configuration as a whole.

Here, because each of the lens portions provided in the lens plate is shaped like a substantially reverse bowl, light is converged by the convex lens effect of the central portion of each lens portion to thereby provide illuminating light as parallel light beams. On the other hand, light emitted laterally or obliquely upward from each LED is radiated from the circumferential portion of the lens portion. The light is efficiently converted into light going toward the light-extracting direction by the function of the reflector. As a result, the amount of light allowed to be used as illuminating light increases. In other words, the illumination device can be provided as an illumination device high in light-extracting efficiency.

Moreover, because the substantially reverse bowl-shaped lens portions are used, the region illuminated by light radiated from surfaces of the lens portions has a relatively wide range. Hence, the number of LEDs required for obtaining a predetermined illumination range of light can be reduced. That is, the number of LEDs used can be reduced. Hence, greater reduction in cost can be achieved by simplification of the configuration of the lens plate and simplification of the whole configuration of the illumination device as well as reduction in production cost can be achieved by the change of the number of LEDs used.

In this aspect of the invention, the lens plate is disposed on the light emission side of the LEDs. The lens plate has substantially reverse bowl-shaped lens portions formed in regions into which light beams emitted from the LEDs are led respectively. The concept "reverse bowl shape" used herein includes a conical shape, a polyangular pyramid shape such as a hexangular pyramid shape or an octangular pyramid shape, and a bell shape. Preferably, the reverse bowl shape is symmetric with respect to its central axis in consideration of control of the form of radiation of light. A shape having asymmetrical portions with respect to its central axis is however allowed to be used.

Preferably, each lens portion is formed so that its central portion is protruded like a convex lens. This is because light emitted from each LED and led into the central portion of a corresponding lens portion is efficiently converged so that light more approximating parallel light beams can be radiated out from a surface of the lens portion.

On the other hand, a region protruded like a convex lens may be preferably provided in the circumferential portion of each lens portion. In this configuration, an effect of converging light into the outside of the circumference of this region can be obtained in this region. Hence, light emitted from each LED and led into this region can be converged and converted so that light can be radiated laterally or obliquely upward from the LED. As a result, the light can be reflected by the reflector to thereby control the direction of radiation of the light.

Incidentally, the boundary between the central portion and the circumferential portion in each lens portion is decided in consideration of the distance between the lens plate and each LED, the light-emitting characteristic of the LED used, the form of illuminating light, and so on. For example, the boundary between the central portion and the circumferential portion is constituted by a set of intersection points between a surface of the lens portion and lines drawn from the light-emitting center of the LED and inclined at an angle of about 45° to about 70° with respect to the optical axis of the LED.

The reflector is provided so that light which is a part of light emitted from each LED and which is radiated through the circumferential portion of a corresponding lens portion is reflected toward the light-extracting direction by a corresponding part of the reflector. Because the reflector is provided, light emitted laterally or obliquely upward from each LED and radiated through the circumferential portion of a corresponding lens portion can be utilized efficiently as illuminating light. Hence, an effect such as improvement of illuminance and enlargement of the illumination region can be fulfilled. Preferably, the reflector has such a reflection surface shape that light reflected by the reflector can be radiated out as parallel light beams. Each part of the reflector is disposed around a corresponding lens portion. Preferably, each part of the reflector is disposed so as to surround the circumference of a corresponding lens portion. The reflector can be made of a metal plate or a suitable resin having its surface plated with a metal.

Preferably, each of the lens portions of the lens plate has a recess formed on the LED side so that the LED is disposed in the recess. This is because light emitted from each LED is efficiently led into a corresponding lens portion. Particularly when chip type LEDs are used, light emitted from each chip type LED is in a so-called diffused state. Hence, when the lens portions are formed in this manner so that the chip type LEDs are enclosed in the lens portions respectively, light emitted from each chip type LED can be extremely efficiently led into a corresponding lens portion. Preferably, each LED is disposed in proximity to a corresponding lens portion so that light can be more efficiently led into the lens portion. According to this arrangement form, greater reduction in thickness can be also attained.

The number of LEDs used is not particularly limited. When a plurality of LEDs are used, an illumination device which can radiate a wider range of light can be formed. In this case, lens portions equal in number to the LEDs used are formed in the lens plate. Because one lens plate having a plurality of lens portions can be used without necessity of disposing a plurality of lens plates correspondingly to the number of the LEDs, the illumination device can be simplified in configuration in the same manner as in the case where the first lens plate is used in the first aspect of the invention. In addition, it is a matter of course that both facilitation of assembling the lens plate and improvement in assembling accuracy can be attained.

The cover may be provided on the light radiation side of the lens plate. A cover shaped like a nearly flat plate (substantially having a smooth surface) can be used as the cover. The front surface (light-radiating surface) or the rear surface of the cover, however, may be roughened suitably. For example, a lens-like portion may be provided in the cover or a surface-roughening treatment may be applied to the cover. In addition, a fluorescent substance, a light-diffusing agent, etc. may be contained in the cover. A layer containing the fluorescent substance, etc. (e.g., a fluorescent substance film) may be formed on a surface (the front surface or the rear surface) of the cover.

Incidentally, configurations not particularly described above, that is, the kind of the LED allowed to be used, the emission color, the form of arrangement, etc. are the same as in the first aspect of the invention.

The illumination device according to the invention can be used for illuminating a place close to occupant's hands in the interior of a vehicle such as a car or a train or an airplane. When, for example, the illumination device is mounted on a rear package of a car, an occupant in the rear seat can use the illumination device as a reading light.

The illumination device may further have a plurality of LED light sources which are disposed so that light beams emitted from the LED light sources illuminate specific areas respectively. The illumination device may be disposed in a roof portion of the interior of a vehicle.

According to this configuration, because the LED light sources are disposed to illuminate specific areas respectively as well as highly directional LEDs are used as the light sources, illumination can be performed so that a narrow range can be illuminated by spotlight-like light. Hence, only the area to be illuminated can be effectively illuminated.

Moreover, when LED light sources each small in the amount of heat generated are used, the illumination device can be switched on continuously for a long time and the purpose of use of the illumination device can be widened.

Moreover, because the provision of a plurality of LED light sources capable of illuminating specific areas respectively means the fact that various illumination forms can be achieved when the on/off actions of the LED light sources are controlled, the illumination device can be provided as an illumination device having a rich variety of illumination forms.

In this configuration, the plurality of LED light sources may be constituted by a combination of LED light sources different in illumination form. In this case, the illumination device can be provided as an illumination device having a rich variety of illumination forms. Further, an appropriate illumination form can be selected in accordance with the situation, so that various illuminating effects can be obtained. In addition to the original purpose of enhancing visibility of the area illuminated by light, the illumination device can be used for the purpose of enhancing decoration property of the interior of the vehicle.

For example, the plurality of LED light sources may be constituted by a combination of at least one LED light source emitting light with predetermined luminance in a first illuminating state and at least one LED light source emitting light with predetermined luminance in a second illuminating state. In this configuration, for example, the illumination device can be provided so that a mode can be selected from three modes, that is, an ON mode (first illumination mode), an OFF mode and an ON mode (second illumination mode) interlocked with the opening/closing of any door. In this case, a plurality of LEDs switched on only in the first illumination mode can be used in combination with a plurality of LEDs switched on only in the second illumination mode. Alternatively, a plurality of LEDs switched on only in the first illumination mode can be used in combination with a plurality of LEDs switched on in the first and second illumination modes.

Incidentally, the plurality of LED light sources in the invention is not limited to the two kinds of LED light sources but may be constituted by a combination of three or more kinds of LED light sources different in illumination form.

LED light sources may be provided for illuminating the respective occupant seats (such as the driver's seat, the passenger seat, and so on). For example, the illumination device according to the invention may be formed to have LED light sources provided in four corners respectively so that light beams emitted from the LED light sources can illuminate the driver's seat, the passenger seat and the right and left rear seats respectively. Alternatively, a plurality of LED light sources may be disposed in each of the four corner portions of the illumination device in this case. At least one LED light source may be further disposed in the central portion separately from the LED light sources disposed in the four corners respectively. For example, the LED light source disposed in the central portion can be used for illuminating a center console or the whole interior of the vehicle. When the area for arrangement of the LED light sources is separated into regions by different subjects of illumination as described above, the regions for illumination may be preferably controlled individually. For example, a switch is provided in accordance with each region so that LED light sources contained in the regions can be switched on/off collectively.

A light-transmissible cover can be provided on the light emission side of the LED light sources. In this case, light emitted from the LED light sources illuminates the interior of the vehicle through the cover. The cover may be subjected to a desired cutting treatment, a coloring treatment, etc. so that the look and color of light radiated out can be changed. Such a treatment may be applied to a part region of the cover so that the aforementioned change can be given to only light radiated through the part region. Cutting treatments different in form may be applied to regions of the cover so that light beams radiated through the regions can have specific light emission forms respectively.

A lens may be provided in addition to the cover or in place of the cover so that light emitted from the LED light source can be converged or diverged by the lens to thereby adjust or change the range illuminated by the light. If the lens is disposed so that the distance between the lens and the LED light source can be changed, light in various illumination ranges can be obtained by adjustment of the position of the lens. In other words, the illumination device is formed so that the range illuminated by light can be changed by adjustment of the position of the lens.

The plurality of LED light sources are disposed so that the LED light sources are arranged as a matrix, for example, viewed from the design surface side. Because the LED light sources are arranged as a matrix, various forms of light such as point light, linear light, surface light or light having a specific shape (e.g., a T shape) can be radiated out. Hence, an appropriate light emission form can be selected in accordance with the necessity. Hence, the illumination device can perform a rich variety of illumination forms such as illumination of only the passenger seat, simultaneous illumination of the passenger seat and the rear seat, illumination of only a console box portion, or illumination of the central passage in a wagon car or the like. In addition, because a required range can be illuminated sufficiently, a spotlight-like illumination state can be formed so that a high illuminating effect can be obtained.

As described above, LED light sources are used in the invention. Because the LED light source is small in size, the size and thickness of the illumination device can be reduced as a whole. Hence, the mount space can be reduced, so that the illumination device does not occupy the space in the interior of the vehicle wastefully. Moreover, because the LED light source is small in size, the degree of freedom for the mount position is enhanced and interior design is excellent.

In practical use, the illumination device according to the invention especially the third aspect of the invention can be disposed in a roof portion of the interior of a vehicle. For example, the illumination device used can be disposed in a roof portion between the driver's seat and the passenger seat, or in a roof portion substantially equally distant from the driver's seat, the passenger seat and the rear seats.

BRIEF DESCRIPTION OF THE DRAWINGS

FIG. 3A is an enlarged plan view of the main illumination section 20 showing the configuration of the main illumination section 20 in the vehicle interior illumination device 1;

FIG. 3B is a sectional view taken along the line 1A—1A in FIG. 3A;

FIG. 3C is a sectional view taken along the line 1B—1B in FIG. 3A;

FIG. 10A is a view showing a state of illumination by the vehicle interior illumination device 101 in the condition that where a switch 140 is switched on;

FIG. 10B is a view showing a state of illumination by the vehicle interior illumination device 101 in the case where any door is opened in the condition that where the switch 140 is switched off;

FIG. 16 is a plan view of a vehicle interior illumination device 201 according to a further embodiment of the invention;

FIG. 17 is a side view of the vehicle interior illumination device 201;

FIG. 25 is a sectional view taken along the line 3D—3D in FIG. 22;

FIG. 26 is a plan view from the arrow 3E in FIG. 23;

FIG. 27 is a plan view from the arrow 3F in FIG. 23;

DETAILED DESCRIPTION OF THE PREFERRED EMBODIMENTS (First Embodiment)

The specific configuration of the invention will be described below with reference to the drawings.

Figure 1:
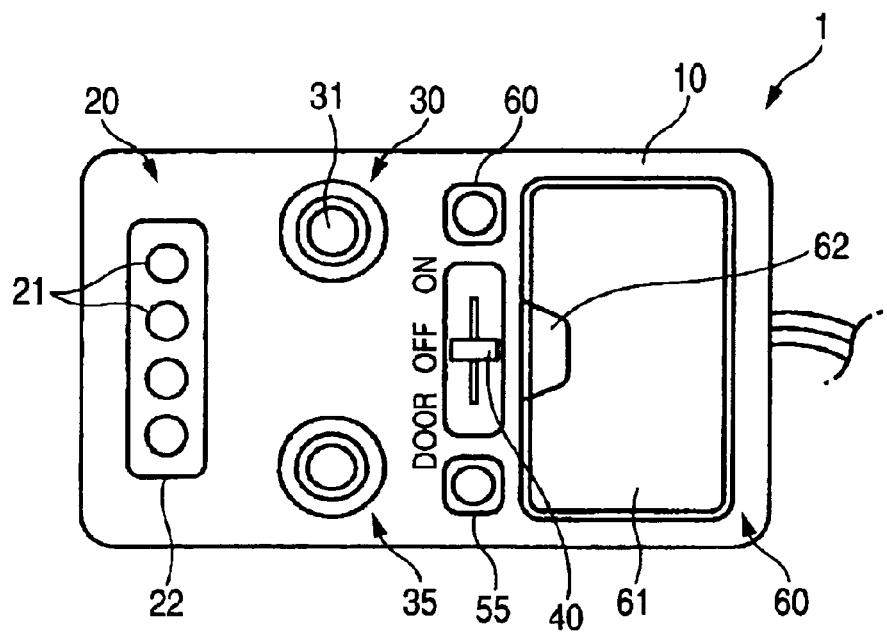
FIG. 1 is a plan view showing the design surface side of a vehicle interior illumination device 1 according to an embodiment of the invention.
Figure 2:
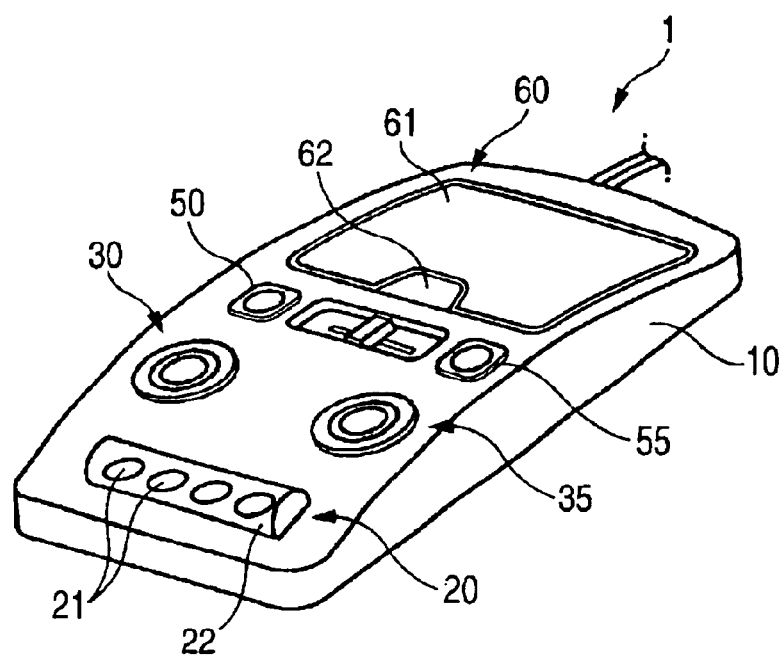
FIG. 2 is a perspective view of the vehicle interior illumination device 1.

FIG. 1 is a plan view showing the design surface side of a vehicle interior illumination device 1 (hereinafter referred to as "illumination device 1") which is an embodiment of the invention. FIG. 2 is a perspective view of the illumination device 1.

The illumination device 1 is roughly shaped like a thin plate. The illumination device 1 has a casing 10, a main illumination section (first light-emitting section) 20, two spot illumination sections (second light-emitting sections) 30 and 35, a main switch 40, two spot illumination switches 50 and 55, and a storage section 60.

The casing 10 is made of a light-proof resin (a resin colored in gray in this embodiment). The main illumination section 20, the spot illumination sections 30 and 35, etc. are disposed on the design surface side of the casing 10.

The main illumination section 20 is provided in an edge portion on one end side of the casing 10. The main illumination section 20 has LEDs 21 (first LEDs), and an outer lens 22 (first outer lens). Each of the LEDs 21 is a round type LED which emits white light. The outer lens 22 is produced by being molded out of an acrylic resin into a desired shape. The outer lens 22 may be produced from another light-transmissible material such as a polycarbonate resin.

Next, the state of arrangement of the LEDs 21 and the shape of the outer lens 22 will be described with reference to FIGS. 3A through 3C. FIG. 3A is an enlarged plan view of the main illumination section 20. FIG. 3B is a sectional view taken along the line 1A—1A in FIG. 3A. FIG. 3C is a sectional view taken along the line 1B—1B in FIG. 3A. Incidentally, FIG. 3B shows only the LEDs 21 and the outer lens 22, and FIG. 3C shows only the outer lens 22. As shown in FIGS. 3A to 3C, the outer lens 22 is substantially rectangular in plan view and has a light-radiating surface (see FIG. 3C) 22a shaped like a convex lens in a section perpendicular to the lengthwise axis. Columnar recesses equal in number to the LEDs 21 are formed in a side (rear surface side) opposite to the light-radiating surface 22a. The LEDs 21 are disposed in the recesses respectively (see FIG. 3A). Each LED 21 is disposed with a slight gap from a corresponding recess. That is, each LED 21 is disposed in proximity to the surface of the outer lens 22 facing the LED 21. When the LEDs 21 are disposed thus, light beams radiated from the LEDs 21 can be led into the outer lens 22 efficiently.

Part of the front surface of the outer lens 22 (the region expressed by the arrows in FIG. 3C) and bottom surfaces of the recesses are planished into mirror surfaces. By the planishing, light can be efficiently taken into the outer lens 22 through the bottom surfaces of the recesses and efficiently radiated from the outer lens 22 through the light-radiating surface 22a.

The LEDs 21 are disposed linearly at regular spaces on a board 23 (see FIGS. 3A and 3B).

Figure 4A:
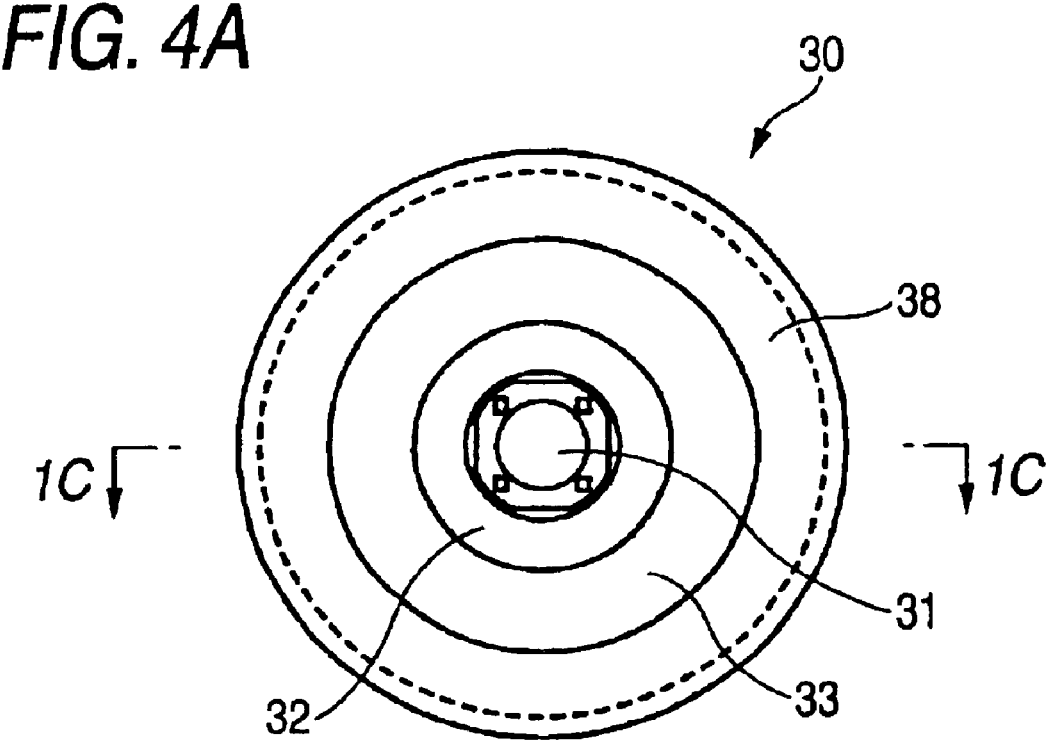
FIG. 4A is an enlarged plan view of the spot illumination section 30 showing the configuration of the spot illumination section 30 in the vehicle interior illumination device 1.
Figure 4B:
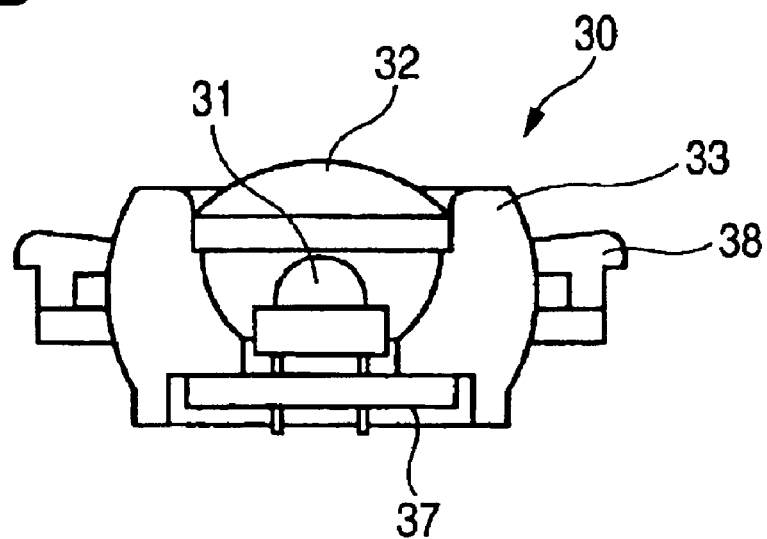
FIG. 4B is a sectional view taken along the line 1C—1C in FIG. 4A.

Next, the configuration of the spot illumination sections 30 and 35 will be described with reference to FIGS. 4A and 4B. Incidentally, because the two spot illumination sections 30 and 35 are equal in configuration to each other, the spot illumination section 30 will be described below as an example. FIG. 4A is an enlarged plan view of the spot illumination section 30. FIG. 4B is a sectional view taken along the line 1C—1C in FIG. 4A. An outer lens 32 having a light-radiating surface shaped like a convex lens, and a planar surface opposite to the light-radiating surface, is used in the spot illumination section 30. The outer lens 32 is produced by being molded out of an acrylic resin in the same manner as the outer lens 22. The material of the outer lens 32 is not limited to the acrylic resin. For example, another light-transmissible material such as a polycarbonate resin may be used as the material of the outer lens 32.

An edge portion of the outer lens 32 is fitted into an inner wall of an upper portion of a bowl-shaped frame member 33. The LED 31 is a white LED having a lens. The LED 31 is mounted on aboard 37. The board 37 is fixed to the rear surface side of the frame member 33 to thereby fix the LED 31 to a position near the surface (incident surface) of the outer lens 32 facing the LED 31. An inner circumference of a fixing frame 38 used for fixing the spot illumination section 30 into the casing 10 bears the frame member 33. Hence, the frame member 33 can be freely moved back and forth and right and left so that the illumination region of light radiated out from the spot illumination section 30 can be changed suitably.

When the fixing frame 38 is fitted into the circumference of a through-hole penetrated in the design surface of the casing 10, the spot illumination section 30 is fixed to the casing 10 in a predetermined position.

The storage section 60 is a section for storing a pair of spectacles. A cover 61 is opened/closed by use of a push-button 62 having a hook. An LED light source (not shown) which is switched on automatically with the opening operation of the cover 61 is provided so that the inside of the storage section 60 can be illuminated by light emitted from the LED light source.

Figure 5:
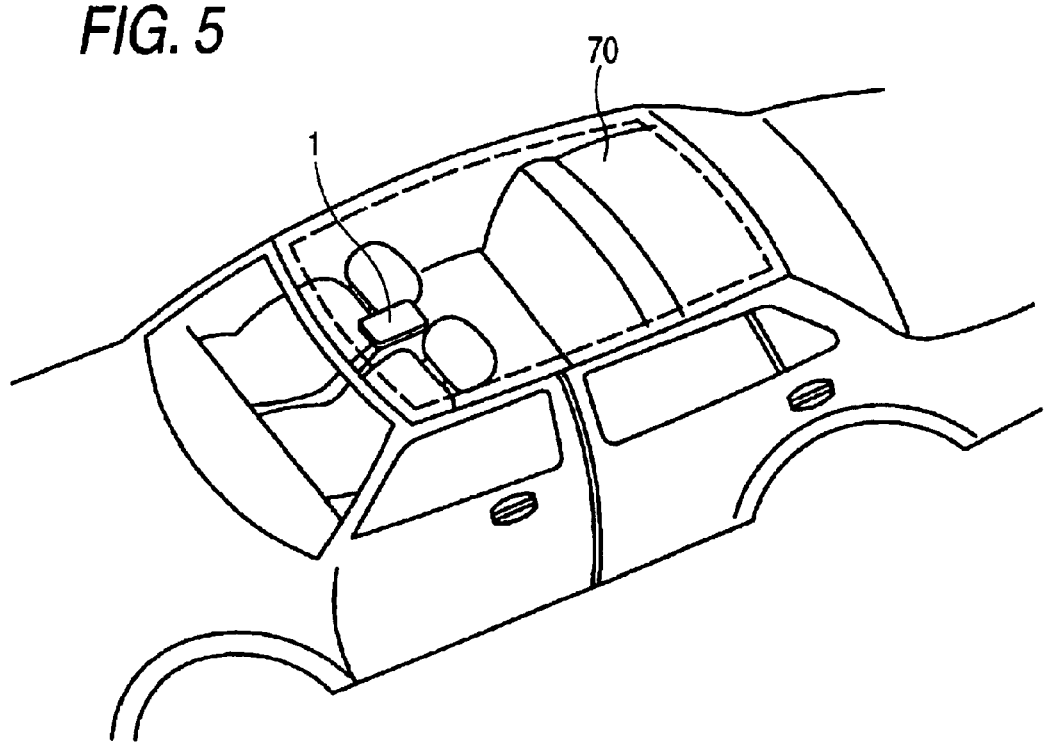
FIG. 5 is a partly transparent perspective view showing the mounting form of the vehicle interior illumination device 1.

As shown in FIG. 5, the illumination device 1 is disposed in a roof portion 70 of the interior of a car and between a driver's seat and a passenger seat so that the storage section 60 side faces the traveling direction.

Next, the form of illumination by the main illumination section 20 of the illumination device 1 will be described. First, when a switch 40 is located in an "OFF" position, no electric current is supplied to the LEDs 21 in the main illumination section 20 so that all the LEDs 21 are off. When the switch 40 is located in an "ON" position, an electric current is supplied to only two LEDs 21 disposed on opposite outer sides. As a result, the incident surface (recess surface) of the outer lens 22 is irradiated with light beams emitted from the two LEDs 21, so that the light beams are taken into the outer lens 22. The light beams taken into the outer lens 22 are guided by the outer lens 22 and finally radiated out from the light-radiating surface 22a. As a result, a predetermined region is irradiated with the white light. In this embodiment, because the shape of the outer lens 22 and the form of arrangement of the LEDs 21 are used as described above, a nearly elliptical region is irradiated with light so that the driver's seat and the passenger seat can be illuminated in a wide range. Here, because each of the LEDs 21 is disposed in corresponding one of the recesses provided on the rear surface side of the outer lens 22 as described above, light beams emitted from the LEDs 21 respectively are efficiently taken into the outer lens 22. Accordingly, illumination can be made by efficient utilization of light beams emitted from the LEDs 21. Moreover, the light beams taken into the outer lens 22 are diffused well in the outer lens 22 by the light-guiding function of the outer lens 22. Hence, light is radiated from almost all the light-radiating surface 22a of the outer lens 22, so that illumination by the radiated light is little in unevenness of illuminance. Moreover, the lens effect of the outer lens 22 makes the illuminating light highly directional. Incidentally, in the case, two inner LEDs 21 used in place of the two outer LEDs 21 may be switched on.

When the switch 40 is located in a "DOOR" position, the LEDs 21 are switched on/off automatically with the opening/closing of doors. That is, when any one of the doors is opened, all the LEDs 21 are switched on. As a result, high-luminance light is radiated from the light-radiating surface 22a of the outer lens 22 to thereby illuminate a wide region in the interior of the vehicle, compared with the case where the switch 40 is located in the "ON" position. Also in this case, light taken into the outer lens 22 is diffused well in the outer lens 22 by the light-guiding function of the outer lens 22, so that illumination little in unevenness of illuminance can be obtained.

Here, because the shape of the outer lens 22 is set as described above as well as light is diffused well in the outer lens 22, the illumination region in the condition that only the two outer LEDs 21 are on is substantially coincident with the illumination region in the condition that all the LEDs 21 are on. On the other hand, because the amount of light taken into the outer lens 22 varies, the two conditions are different from each other in illuminance. In the illumination device 1, the number of LEDs to be switched on can be controlled in this manner so that illuminance can be adjusted without change of the illumination region. Accordingly, a simplified configuration can be achieved.

Incidentally, illuminace in illumination obtained by the main illumination section 20 may be adjusted by control of the amount of the current to be supplied to each LED 21 in place of control of the number of LEDs 21 to be switched on. When, for example, low illuminance in illumination is to be performed (e.g., in the "ON" state of the switch 40), a current smaller in quantity than the current in the case of high illuminance (e.g., when any one of the doors is opened in the "OFF" state of the switch 40) is supplied to each LED 21 so that all the LEDs 21 are switched on with low illuminance.

Next, the form of illumination by the stop illumination sections 30 and 35 will described while the former section 30 is taken as an example. The spot illumination section 30 is switched on/off by a spot illumination switch 50 for exclusive use. The spot illumination switch 50 is a push switch. Whenever the spot illumination switch 50 is pushed, the LED 31 of the spot illumination section 30 is switched on/off alternately. When the spot illumination switch 50 is pushed to switch on the LED 31, light emitted from the LED 31 is led into the outer lens 32 from the rear surface side of the outer lens 32. The light led in thus is converged by the outer lens 32. As a result, the interior of the vehicle is illuminated by spotlight-like light (white) having a relatively narrow irradiation range. Here, because the spot illumination section 30 can be moved freely back and forth and right and left between the frame member 33 and the fixing frame 38 as described above, a desired region can be irradiated with the light of the stop illumination section 30. For example, the spot illumination section 30 can be used as a driver's map lamp or for illuminating a part of a center console. Because the spot illumination section 30 is made movable as described above, a subject of illumination can be widened and the illumination region can be adjusted finely by the occupant himself or herself. Hence, the spot illumination section 30 becomes easy to handle.

Figure 6A:
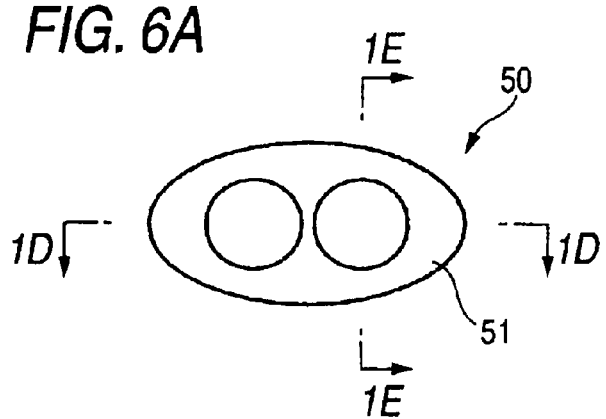
FIG. 6A is a plan view showing the light-radiating surface side of another outer lens 50 which can be used in the main illumination section.
Figure 6B:
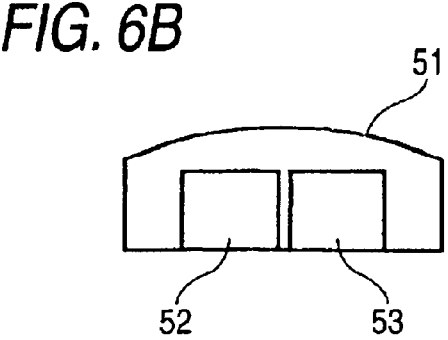
FIG. 6B is a sectional view taken along the line 1D—1D in FIG. 6A.
Figure 6C:
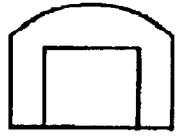
FIG. 6C is a sectional view taken along the line 1E—1E in FIG. 6A.

The embodiment has shown the case where one outer lens substantially rectangular in plan view and four LEDs are used in the main illumination section 20. FIGS. 6A to 6C show another example of the outer lens allowed to be used in the main illumination section 20. FIG. 6A is a plan view showing the light-radiating surface side of the outer lens 50. FIG. 6B is a sectional view taken along the line 1D—1D in FIG. 6A. FIG. 6C is a sectional view taken along the line 1E—1E in FIG. 6A. The outer lens 50 is elliptical in plan view and has a light-radiating surface 51 shaped like a convex lens elevated like a circular arc from an edge portion to a central portion. Two columnar recesses 52 and 53 are formed in the rear surface side of the outer lens 50 in the same manner as in the outer lens 22. The recesses 52 and 53 are formed so as to be close to each other in the vicinity of the central portion of the outer lens 50. At the time of use, LEDs are disposed in the recesses 52 and 53 respectively.

Because the two recesses 52 and 53 are formed in this manner, the positions of incidence of light beams emitted from the LEDs disposed in the recesses 52 and 53 respectively are near the central portion of the outer lens 50 and close to each other. In addition, because light is diffused well in the outer lens 50 by the light-guiding function of the outer lens 50, respective light beams which are radiated from the light-radiating surface 51 of the outer lens 50 when the LEDs are switched on become substantially equivalent to each other in terms of illuminance and illumination region. On the other hand, respective illuminating light beams which are obtained when the LEDs are switched on are made highly directional by the lens effect of the outer lens 50. From the above description, illuminating light which is obtained when the two LEDs are switched on simultaneously is very close to a spotlight so that the region illuminated by the light is clear, with the result that a high illuminating effect can be fulfilled. On the other hand, when light beams caused by the LEDs illuminate substantially one region, it means that not the illumination region but illuminance is different between the case where only one of the two LEDs is switched on and the case where the two LEDs are switched on simultaneously. Accordingly, a low-luminance illuminating state and a high-luminance illuminating state can be produced without unevenness of illuminance by a simple control method of controlling the number of LEDs to be switched on.

Further, the illumination device 1 may be configured as follows. That is, a blue light-emitting device (such as an LED using Group III nitride compound semiconductor as a material) may be used as each of the LEDs used in the main and spot illumination sections. In addition, each of the outer lenses used in the main and spot illumination sections may contain a fluorescent substance having a fluorescent color ranging from yellow to yellowish green (such as ZnS:Cu, Au, Al; ZnS:Cu, Al; ZnS:Cu; ZnS:Mn; ZnS:Eu; YVO$_4$:Eu; YVO$_4$:Ce; Y$_2$O$_2$S:Eu; or Y$_2$O$_2$Se:Ce). In the illumination device configured as described above, the fluorescent substance in the outer lens of the main illumination section is irradiated with a part of light emitted from each LED in the main illumination section, so that fluorescence of a color ranging from yellow to yellowish green is generated from the fluorescent substance. The fluorescence and the other part of blue light not used for excitation of the fluorescent substance are radiated out while the color of the fluorescence is mixed with the color of the other part of light. As a result, illumination is performed by white light. Also in each spot illumination section, the color (ranging from yellow to yellowish green) of fluorescence generated from the fluorescent substance in the outer lens is mixed with the color of blue light emitted from the LED in the same manner as described above, so that illumination is performed by white light.

In a further modification of this embodiment, an LED for emitting light in an ultraviolet region (such as an LED using Group III nitride compound semiconductor as a material) may be used as each of the LEDs used in the main and spot illumination sections. In addition, each of the outer lenses used in the main and spot illumination sections may contain a red fluorescent substance (such as 6MgO.As$_2$O$_5$:Mn$^{4+}$; Y(PV)O$_4$:Eu; CaLa$_{0.1}$Eu$_{0.9}$Ga$_3$O$_7$; BaY$_{0.9}$Sm$_{0.1}$Ga$_3$O$_7$; Ca(Y$_{0.5}$Eu$_{0.5}$) (Ga$_{0.5}$In$_{0.5}$)$_3$O$_7$; Y$_3$O$_3$:Eu; YVO$_4$:Eu; Y$_2$O$_2$:Eu; 3.5MgO.0.5MgF$_2$GeO$_2$:Mn$^{4+}$; or (Y.Cd)BO$_2$:Eu), a green fluorescent substance (such as Y$_3$Al$_5$O$_{12}$:Ce$^{3+}$ (YAG); Y$_2$SiO$_5$:Ce$^{3+}$, Tb$^{3+}$; Sr$_2$Si$_3$O$_8$.2SrCl$_2$:Eu; BaMg$_2$Al$_{16}$O$_{27}$:Eu$^{2+}$, Mn$^{2+}$; ZnSiO$_4$:Mn; Zn$_2$SiO$_4$:Mn; or LaPO$_4$:Tb), and a blue fluorescent substance (such as (Ba, Ca, Mg)$_5$(PO$_4$)$_3$Cl:Eu$^{2+}$; (Ba, Mg)$_2$Al$_{16}$O$_{27}$: Eu$^{2+}$; Ba$_3$MgSi$_2$O$_8$: Eu$^{2+}$; or BaMg$_2$Al$_{16}$O$_{27}$:Eu$^{2+}$). In the illumination device configured as described above, the fluorescent substances in the outer lens of the main illumination section are irradiated with light emitted from each LED in the main illumination section, so that three kinds of fluorescence, that is, red fluorescence, green fluorescence and blue fluorescence are generated from the fluorescent substances respectively. The colors of the three kinds of fluorescence are mixed to form white light, so that the white light is radiated out. As a result, illumination is performed by the white light. Also in each spot illumination section, three kinds of fluorescence, that is, red fluorescence, green fluorescence and blue fluorescence are generated in the outer lens of the spot illumination section on the basis of light emitted from the LED, and the colors of the three kinds of fluorescence are mixed to form white light, so that the white light is radiated out. As a result, illumination is performed by the white light.

(Second Embodiment)

The specific configuration of a second embodiment of the invention will be described below with reference to the drawings.

Figure 7:
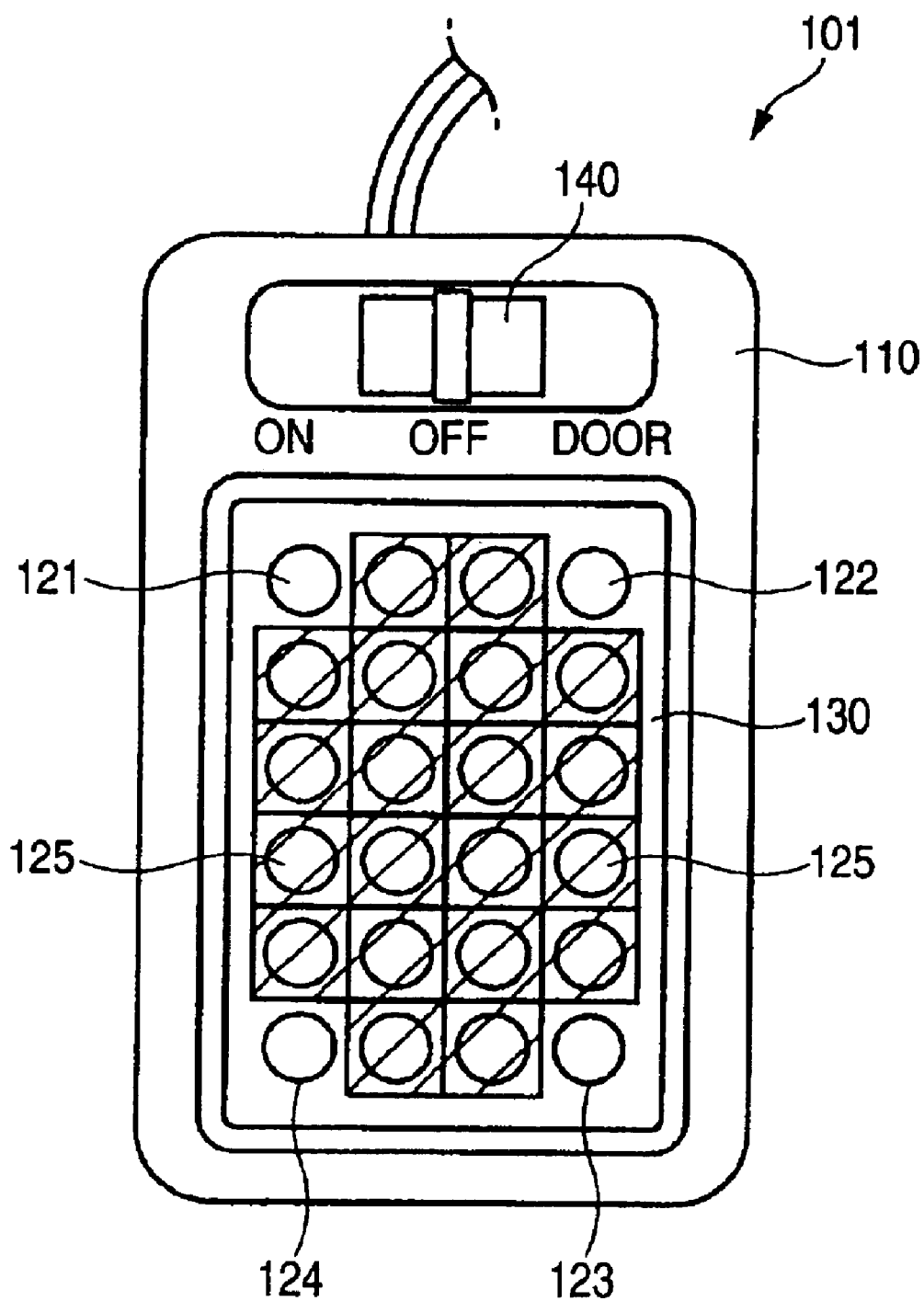
FIG. 7 is a plan view showing the design surface side of a vehicle interior illumination device 101 according to another embodiment of the invention.
Figure 8:
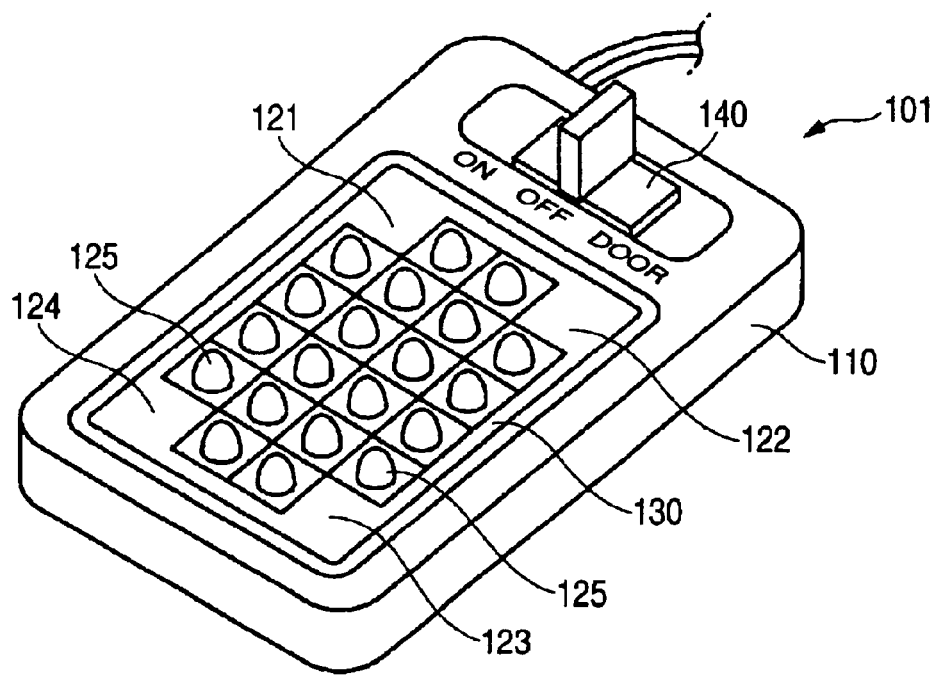
FIG. 8 is a perspective view of the vehicle interior illumination device 101.

FIG. 7 is a plan view showing the design surface side of a vehicle interior illumination device 101 (hereinafter referred to as "illumination device 101") which is an embodiment of the invention. FIG. 8 is a perspective view of the illumination device 101.

The illumination device 101 is roughly shaped like a thin plate. The illumination device 101 has a casing 110, a plurality of LEDs 121 to 125, a cover 130, and a switch 140. The casing 110 has a rectangular opening portion for light emission, and an opening portion for the switch 140. The opening portions are provided in one surface of the casing 110. Each of the LEDs 121 to 125 is a round type LED which emits umber light. LEDs 125 disposed in the central portion of the illumination device 101 are fixed onto a board not shown so that the optical axis of each of the LEDs 125 is substantially perpendicular to the cover 130. On the other hands, the positions of LEDs 121 to 124 disposed in four corners are adjusted so that the optical axis of each of the LEDs 121 to 124 is slightly inclined toward a corresponding corner from a direction perpendicular to the cover 130 (e.g., the optical axis of the LED 121 is slightly inclined upward left and the optical axis of the LED 122 is slightly inclined upward right in FIG. 7).

The cover 130 is made of a light-transmissible resin (such as a polycarbonate resin or an acrylic resin). A cutting treatment for diffusing light is applied to the inner side of the central portion (hatched in FIG. 7) of the cover 130, that is, the inner side of the portion irradiated with light emitted from the LEDs 125.

Incidentally, a control circuit for controlling the on/off state of the LEDs 121 to 125 in accordance with the position of the switch 140 is provided on a board not shown.

Figure 9:
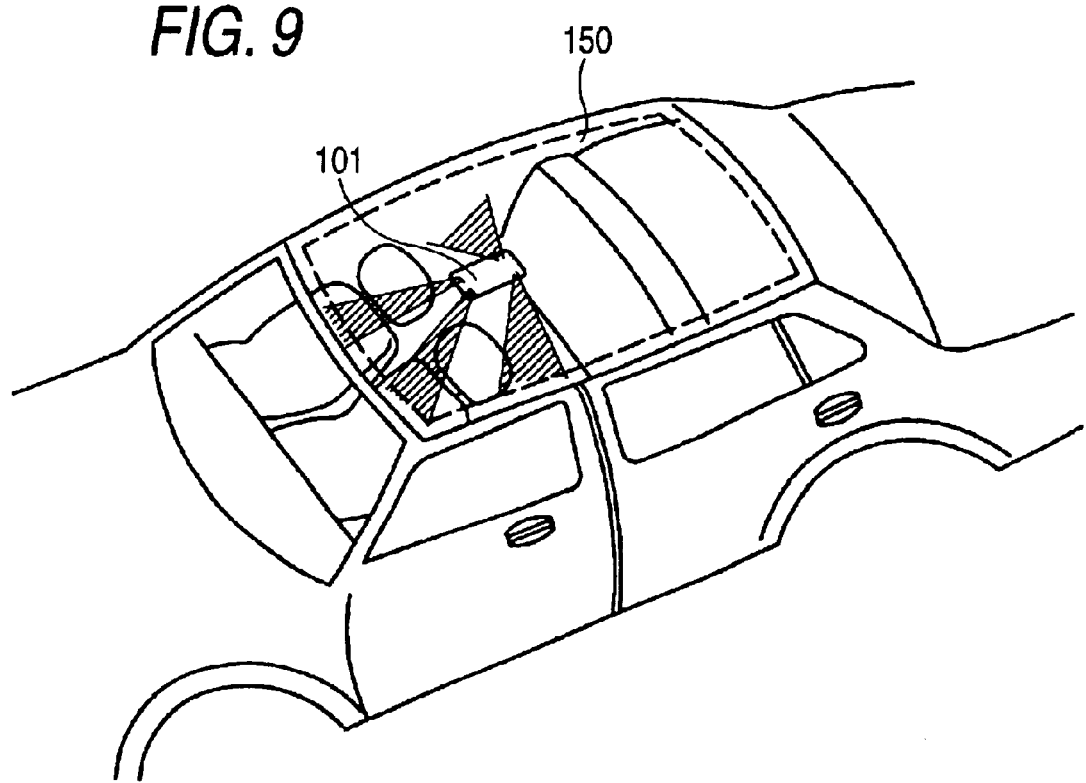
FIG. 9 is a partly transparent perspective view showing the mounting form of the vehicle interior illumination device 101.

As shown in FIG. 9, the illumination device 101 used is substantially disposed in the center of a roof portion 150 in the interior of a vehicle so that the switch 140 side faces the traveling direction.

Next, the form of illumination by the illumination device 101 will be described with reference to FIGS. 7 and 9 and FIGS. 10A and 10B. Incidentally, in FIGS. 10A and 10B, LEDs 121 to 125 shown as black-painted portions indicate that the LEDs 121 to 125 are on.

First, when the switch 140 is located in the "OFF" position as shown in FIG. 7, all the LEDs 121 to 125 are off. When the switch 140 is then turned to the "ON" position, all the LEDs 121 to 125 are supplied with a current and switched on (as shown in FIG. 10A). In this condition, highly directional light beams emitted from the LEDs 121 to 124 illuminate the driver's seat, the passenger seat and the left and right rear seats, respectively, in a spotlight form. At the same time, light beams emitted from the LEDs 125 are diffused by the cover 130 and then radiated out to illuminate a wide range of the interior of the vehicle. On the other hand, when the switch 140 is located in the "DOOR" position, the LEDs 121 to 124 are switched on/off automatically with the opening/closing of any door. FIG. 10B shows the light-emitting state of the illumination device 101 in the case where any door is opened (i.e., any occupant gets into the vehicle or out of the vehicle). In this condition, highly directional light beams emitted from the LEDs 121 to 124 illuminate the driver's seat, the passenger seat and the left and right rear seats, so that visibility thereof is enhanced. Here, because spotlight-like illumination is performed by highly directional light, the place close to the feet of an occupant desiring to get into the vehicle or out of the vehicle can be illuminated effectively. In addition, a decorative effect can be fulfilled. Although this embodiment has shown the case where all the LEDs 121 to 124 are switched on automatically with the opening of any door, the invention may be also applied to the case where control can be performed so that only one corresponding LED is switched on (e.g., the LED 121 is switched on automatically with the opening of the driver's seat side door). Further, when the switch 140 is located in the "DOOR" position, the LEDs 121 to 124 may be switched on so as to be interlocked with side-marker lights (position lamps). In this case, brightness of the LEDs can be controlled so that the LEDs emit faint light.

Figure 11:
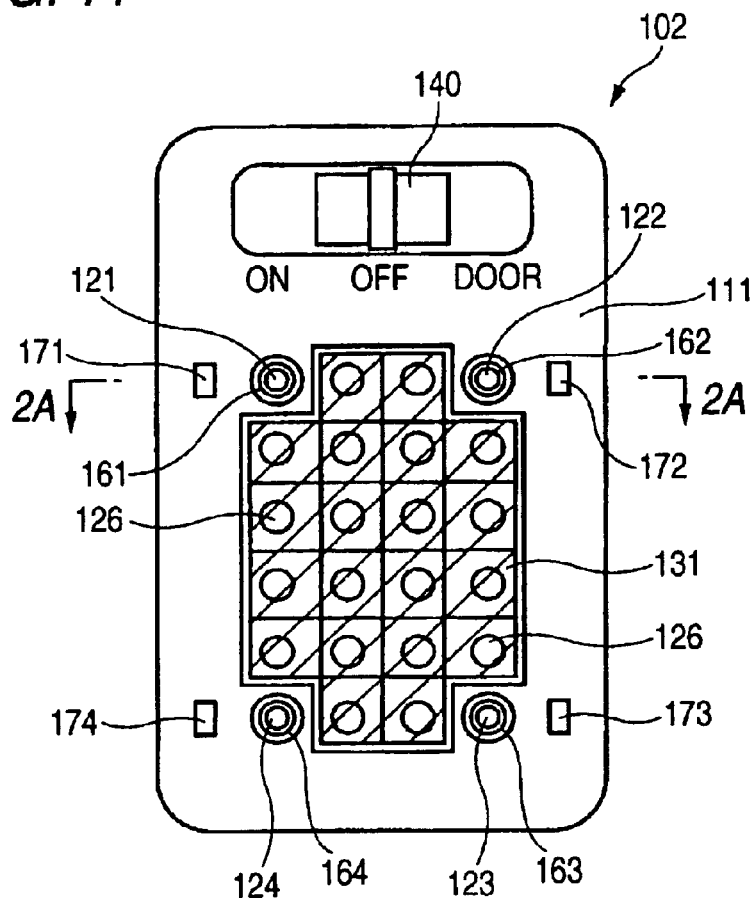
FIG. 11 is a plan view showing the design surface side of a vehicle interior illumination device 102 according to a modification of this embodiment.
Figure 12:
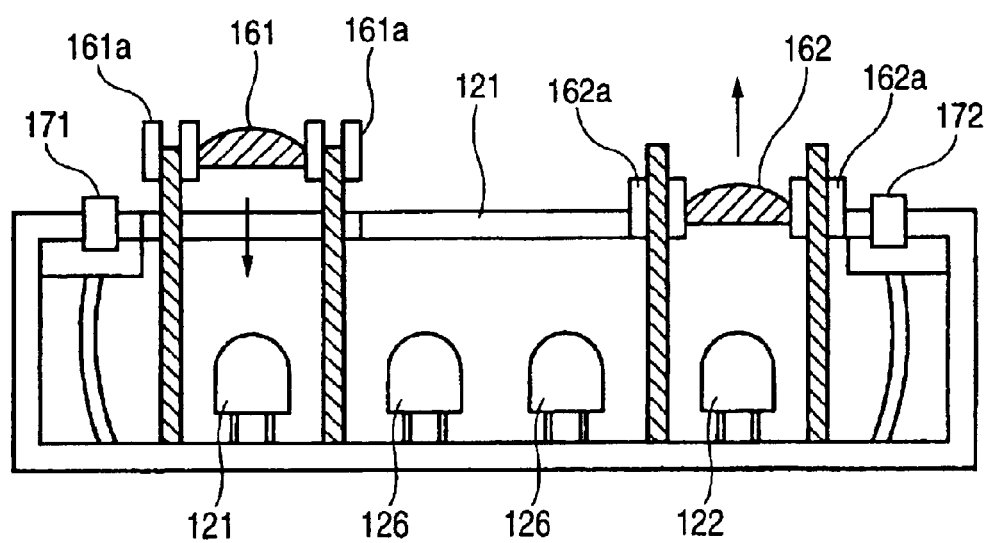
FIG. 12 is a sectional view taken along the line 2A—2A in FIG. 11.

A vehicle interior illumination device 102 (hereinafter referred to as "illumination device 102") which is a modification of this embodiment will be described below with reference to FIGS. 11 and 12. FIG. 11 is a plan view showing the design surface side of the illumination device 102. FIG. 12 is a sectional view taken along the line 2A—2A in FIG. 11. Incidentally, in the illumination device 102, parts the same as those in the illumination device 101 are referred to by numerals the same as those in the illumination device 101 for the sake of omission of duplicated description.

A casing 111 is used in the illumination device 102. The casing 111 has a cross-shaped opening portion for radiating light of a plurality of LEDs 126, and circular opening portions for radiating light of LEDs 121 to 124 respectively. Each of the LEDs 121 to 124 is an LED which emits umber light. Each of the LEDs 126 is an LED which emits white light. A light-transmissible cover 131 having its inner side subjected to a cutting treatment is attached to the cross-shaped opening portion of the casing 111. On the other hand, lenses 161 to 164 which serve also as covers are disposed on the light emission sides of the LEDs 121 to 124 respectively so that the distance between each of the lenses 161 and 164 LED and a corresponding LED can be changed (see FIG. 12). The lenses 161 to 164 are convex lenses. The lenses 161 to 164 are attached to the casing 111 through lens frames 161a to 164a respectively so that the lenses 161 to 164 can move up and down (dialing system). That is, when the lens frames 1.61a to 164a are rotated, the lenses 161 to 164 can move up and down to thereby change the range of irradiation with light radiated out through the lenses 161 to 164.

Push switches 171 to 174 are provided on sides of the LEDs 121 to 124 respectively. The LEDs 121 to 124 can be switched on/off by the switches 171 to 174 individually and respectively.

In practical use, the illumination device 102 is disposed in the central portion of a roof portion of a vehicle in the same manner as the illumination device 101. Next, the form of illumination by the illumination device 102 will be described. First, when the switch 140 is located in the "OFF" position as shown in FIG. 11, the LEDs 121 to 124 and 126 are off. When the switch 140 is then turned to the "ON" position, all the LEDs 126 are supplied with a current and switched on. In this condition, white light emitted from the LEDs 126 is diffused by the cover 131 and radiated out. As a result, the white light illuminates a wide range of the interior of the vehicle. On the other hand, when the switch 140 is located in the "DOOR" position, the LEDs 121 to 124 are switched on/off automatically with the opening/closing of any door. That is, when any door is opened (i.e., when an occupant gets into the vehicle or out of the vehicle), umber light emitted from the LEDs 121 to 124 forms a spotlight for illuminating the driver's seat, the passenger seat and the rear seats. Here, because white LEDs are used as the LEDs for illuminating a wide range whereas umber LEDs are used as the LEDs for illuminating the driver's seat, etc. individually, illumination can be performed by two kinds of light different in color and an decorative effect can be obtained.

Next, the functions and effects of the push switches 171 to 174 and the lenses 161 to 164 will be described while light emitted from the LED 121 is taken as an example. First, when the push switch 171 is pushed in the condition that the switch 140 is located in the "OFF" or "DOOR" position, the LED 121 is in an ON state to be lit up. Hence, light emitted from the LED 121 forms a spotlight for illuminating the driver's seat. If the lens frame 161a is now rotated so that the lens 161 moves up and down, the range of irradiation with the light emitted from the LED 121 can be changed. That is, when the lens frame 161a is rotated, the range of irradiation with the light can be adjusted to a desired range.

Because the illumination device 102 is configured as described above so that the on/off actions of the LEDs 121 to 124 can be also controlled by the individual push switches 171 to 174 respectively, only one required LED can be switched on in accordance with the situation. Accordingly, when, for example, the hands of an occupant on the rear seat need to be illuminated, only one LED (LED 163 or 164) corresponding to the seat can be selectively switched on. In this case, necessary illumination can be obtained without wasteful illumination of the other seats (the driver's seat and the passenger seat), that is, a required illuminating effect can be obtained sufficiently. In addition, because the radiation ranges of the LEDs 121 to 124 can be adjusted by the lenses 161 to 164 respectively, a suitable range of irradiation with light can be obtained in accordance with the necessity.

Although this modification of the embodiment has shown the case where the illumination device 102 is configured so that the direction of radiation from each of the LEDs 121 to 124 is fixed and the range of radiation can be adjusted in accordance with the position of corresponding one of the lenses 161 to 164, the invention may be also applied to the case where the direction of radiation from each of the LEDs 121 to 124 can be changed up and down and right and left manually or electrically. In this case, more accurate illumination can be performed so that a high illuminating effect can be obtained. In addition, the subject of illumination by one LED can be widened so that convenience is improved.

Figure 13:
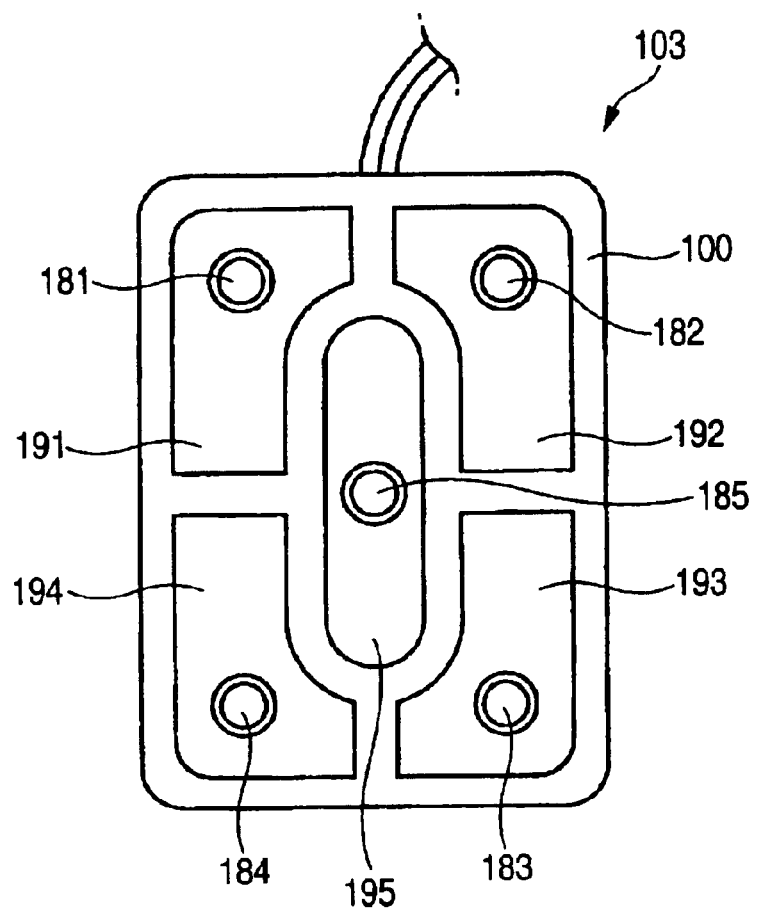
FIG. 13 is a plan view showing the design surface side of a vehicle interior illumination device 103 according to another modification of this embodiment.
Figure 14:
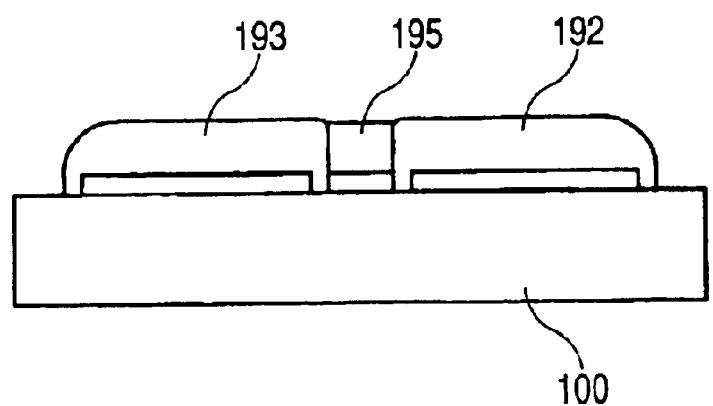
FIG. 14 is a side view of the vehicle interior illumination device 103.

Next, a vehicle interior illumination device 103 (hereinafter referred to as "illumination device 103") which is a modification of this embodiment will be described with reference to FIGS. 13 and 14. FIG. 13 is a plan view showing the design surface side of the illumination device 103. FIG. 14 is a side view of the illumination device 103. In practical use, the illumination device 103 is disposed in a roof portion of a vehicle in the same manner as in the embodiment.

Umber LEDs 181 to 185 are used in the illumination device 103 so that light beams are radiated from through-holes provided in a central portion and four corner portions in a casing 100. Covers 191 to 195 each made of a light-transmissible resin are used for covering the LEDs 181 to 185 respectively. A cutting treatment is applied to the inner side of each of the covers 191 to 195. Edge portions of the covers 191 to 195 are connected to a switching circuit in the casing 100 through slits provided in the casing 100, so that when any one of the covers 191 to 195 is pushed toward the casing 100, corresponding one of the LEDs is switched on/off alternately. When, for example, the cover 191 is pushed, the LED 181 is switched on so that light is radiated through the cover 191. As a result, part of the interior of the vehicle (e.g., driver's seat) is illuminated. On the other hand, when the cover 191 is pushed in the condition that the LED 181 is on, the LED 181 is switched off. In this manner, in the illumination device 103, the covers 191 to 195 are used as switches for switching on/off the LEDs respectively.

Figure 15:
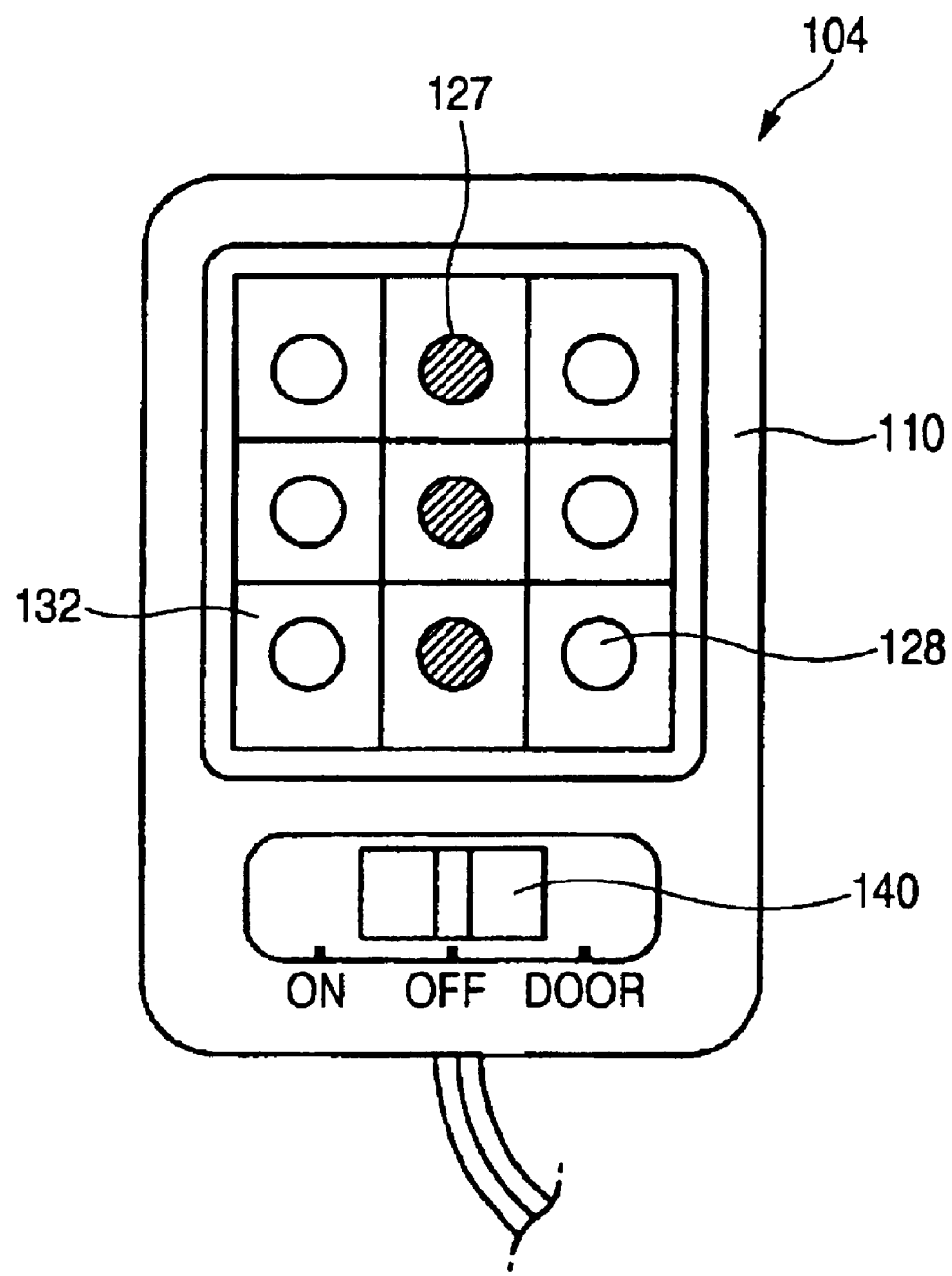
FIG. 15 is a plan view showing the design surface side of a vehicle interior illumination device 104 according to a further modification of this embodiment.

Next, a vehicle interior illumination device 104 (hereinafter referred to as "illumination device 104") which is another modification of this embodiment will be described with reference to FIG. 15. FIG. 15 is a plan view showing the design surface side of the illumination device 104. Incidentally, in the illumination device 104, parts the same as those in the illumination device 101 are referred to by numerals the same as those in the illumination device 101 for the sake of omission of duplicated description.

In the illumination device 104, LEDs 127 for emitting umber light and LEDs 128 for emitting white light are used in combination. As shown in FIG. 15, the LEDs 127 and 128 are arranged so that LEDs of the same color form a column. In this modification of the embodiment, umber LEDs 127 are arranged in a central column and white LEDs 128 are arranged in opposite side columns. A light-transmissible cover 132 having its inner side subjected to a cutting treatment is attached to the light-emitting side of each of the LEDs 127 and 128.

In practical use, the illumination device 104 is disposed in a central portion of a roof portion of a vehicle in the same manner as the illumination device 101. Next, the form of illumination by the illumination device 104 will be described. First, when the switch 140 is located in the "OFF" position, the LEDs 127 and 128 are off (even in the case where the vehicle is running). When the switch 140 is then turned to the "ON" position, all the LEDs 127 and 128 are supplied with a current and switched on. In this condition, umber light beams emitted from the LEDs 127 and white light beams emitted from the LEDs 128 are diffused by the covers 132 and radiated out. As a result, an area located between the seats, such as the central portion of the interior of the vehicle (e.g., an inter-seat passage in a one-box car or a center console portion in a sedan car) is mainly illuminated by umber light while the other portion of the interior of the vehicle is mainly illuminated by white light. On the other hand, when the switch 140 is located in the "DOOR" position, the LEDs 127 and 128 are switched on/off automatically with the opening/closing of any door. That is, when any door is opened (i.e., when an occupant gets into the vehicle or out of the vehicle), all the LEDs 127 and 128 are switched on so that the same illuminating effect as described above can be obtained. In addition, the LEDs 127 are switched on to be interlocked with the switching-on of side-marker lights (position lamps) so that the central portion of the interior of the vehicle (e.g., an inter-seat passage in a one-box car or a center console portion in a sedan car) is illuminated by faint umber light. According to the form of illumination, visibility in the central portion of the interior of the vehicle can be improved and an decorative effect can be obtained.

(Third Embodiment)

Figure 18:
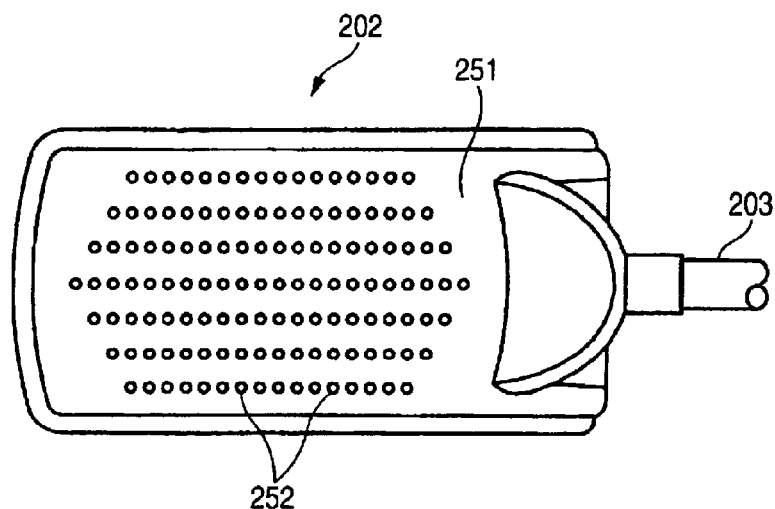
FIG. 18 is a partly back view of the vehicle interior illumination device 201 showing the configuration of the back of the illumination section 202.
Figure 19:
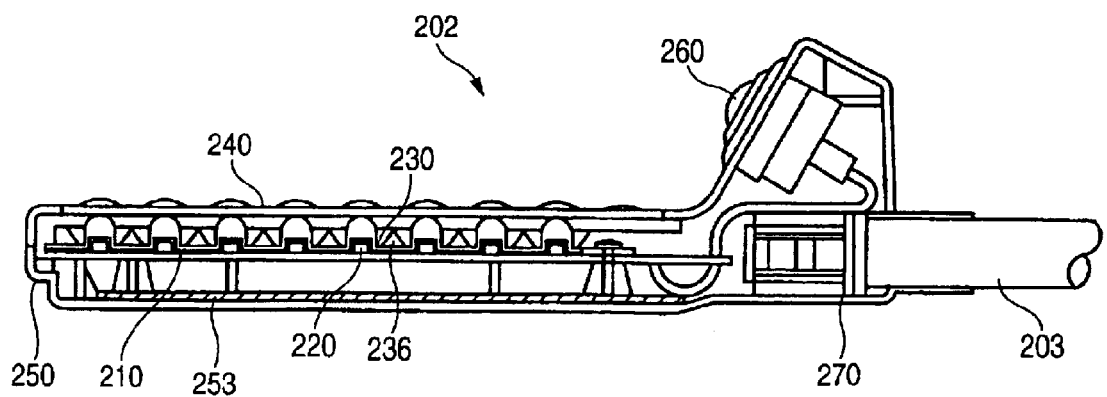
FIG. 19 is a sectional view taken along the line 3C—3C in FIG. 16.
Figure 20:
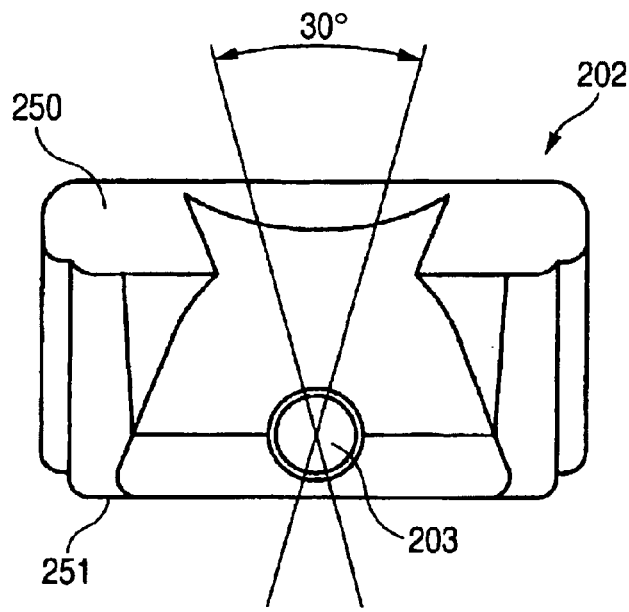
FIG. 20 is a plan view from the arrow 3A in FIG. 17.
Figure 21:
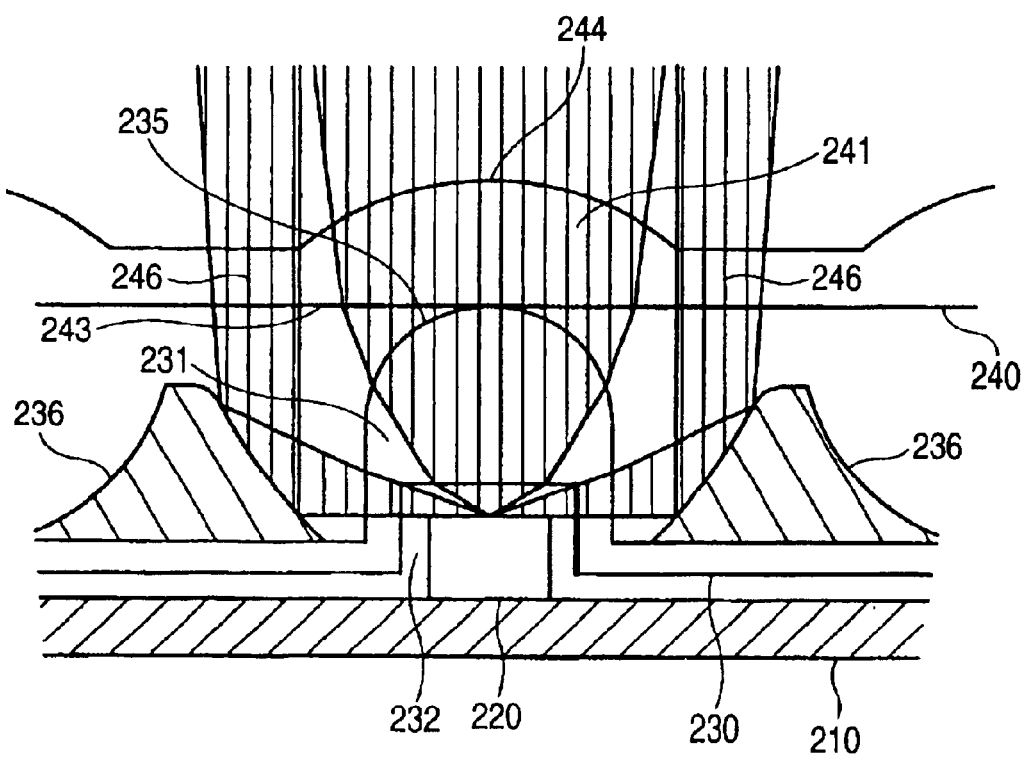
FIG. 21 is a partly enlarged view of FIG. 19, showing the configuration of the first lens plate 230, the second lens plate 240 and the reflector 236 and the form of radiation of light.

FIG. 16 is a plan view of a vehicle interior illumination device 201 (hereinafter referred to as "illumination device 201") which is a third embodiment of the invention. FIG. 17 is a side view of the illumination device 201. FIG. 18 is a partly back view of the illumination device 201. FIG. 19 is a sectional view taken along the line 3C—3C in FIG. 16. FIG. 20 is a plan view of the illumination device 201 from the arrow 3A in FIG. 17. FIG. 21 is a partly enlarged view of the illumination device 201 depicted in FIG. 19.

The illumination device 201 has an illumination section 202, an arm section 203, and an attachment section 204.

The illumination section 202 has a board 210, chip type LEDs 220, a first lens plate 230, and a second lens plate 240. These members are received in a casing 250. Each of the chip type LEDs 220 is an LED for emitting white light.

The chip type LEDs 220 are mounted on the board 210 so that the chip type LEDs 220 are arranged as a matrix. Incidentally, predetermined wiring patterns are formed in the board 210. The wiring patterns in the board are connected to power-supply wiring. In practical use, the wiring is connected to a vehicle side power supply so that electric power is supplied to each of the chip LEDs 220. The chip type LEDs 220 are connected to a switch 260 through the wiring patterns in the board 210. A control circuit not shown is formed between the switch 260 and the chip type LEDs 220. Whenever the switch 260 is pushed, all the chip type LEDs 220 are switched on/off alternately.

A plurality of holes 252 for radiating heat are provided in a bottom 251 of the casing 250. On the other hand, the inner side of the bottom 251 is entirely covered with an unwoven fabric sheet 253 to prevent the illumination section 202 from being contaminated with dust contained in air through the holes 252.

The arm section 203 is made of a flexible tube having a hollow portion through which wiring passes. The surface of the flexible tube is plated with chromium. The arm section 203 is connected to a central portion of one end side of the illumination section 202 through an O-ring 270 so that the illumination section 202 can rotated freely around the arm section 20 as a pivot by about 30° (see FIG. 20).

In practical use of the illumination device 201, the attachment section 204 is fixed to a rear package of a car by bolts. In addition, the arm section 203 is bent suitably to adjust the position of the illumination section 202 and the direction of radiation of light.

Next, the configuration of the first lens plate 230, the second lens plate 240 and the reflector 236 and the form of radiation of light will be described with reference to FIG. 21 which is a partly enlarged view of FIG. 19.

The first lens plate 230 is molded out of a light-transmissible resin (a polycarbonate resin in this embodiment) The first lens plate 230 has a plurality of first lens portions 231 each shaped like a convex lens. The first lens portions 231 are disposed at regular spaces in front, rear, left and right directions. The first lens plate 230 is disposed in parallel with the board 210 while a surface of the first lens plate 230 opposite to the surface of formation of the first lens portions 231 faces downward so that the center of each first lens portion 231 in plan view coincides with the center of corresponding one of the chip type LEDs 220 mounted on the board 210. The first lens plate 230 has recesses 232 formed opposite to the first lens portions 231. The chip type LEDs 220 are positioned in the recesses 232 respectively.

The second lens plate 240 is molded out of a light-transmissible resin (a polycarbonate resin in this embodiment) in the same manner as the first lens plate 230. The second lens plate 240 has a plurality of second lens portions 241 each shaped like a convex lens. The curvature of a surface of each of the second lens portions 241 is slower than that of a surface of each of the first lens portions 231. The outer diameter of each of the second lens portions 241 is larger than that of each of the first lens portions 231. The second lens portions 241 are disposed at regular spaces in front, rear, left and right directions in the same manner as the first lens portions 231 of the first lens plate 230. The second lens plate 240 is disposed in parallel with the first lens plate 230 while a surface of the second lens plate 240 opposite to the surface of formation of the second lens portions 241 faces downward so that the first lens plate 230 is covered with the second lens plate 240. Incidentally, as shown in FIG. 21, when the second lens plate 240 is provided, the central positions of the second lens portions 241 coincide with the central positions of the first lens portions 231 of the first lens plate 230 and with the central positions of the chip type LEDs 220 respectively in plan view.

The reflector 236 is provided between the first lens plate 230 and the second lens plate 240 so that each part of the reflector 236 is positioned to be clamped between two adjacent first lens portions 231. As a result, the reflector 236 is arranged so that the first lens portions 231 are enclosed in the respective parts of the reflector 236. Each part of the reflector 236 has a metal surface plated with Ni. The surface of each part of the reflector 236 is curved like a bowl toward the light-extracting direction.

Next, the form of illumination by the illumination device 201 will be described. When the switch 260 is operated so that the chip type LEDs 220 are switched on, light of a wide range is emitted from the chip type LEDs 220. A large part of the light is led into the first lens portions 231 through the bottoms of the recesses 232 of the first lens plate 230. The light led into the first lens portions 231 is converged by the lens effect of the first lens portions 231 and then radiated from front surfaces 235 of the first lens portions 231. Successively, a rear surface 243 of the second lens plate 240 is irradiated with the radiated light, so that the radiated light is led into the second lens portions 241. The light is also converged in the second lens portions 241 by the lens effect of the second lens portions 241. As a result, light having the flux of substantially parallel rays (parallel light beams) is radiated out from front surfaces 244 of the second lens portions 241.

On the other hand, light radiated laterally from the chip type LEDs 220 is led into the first lens plate 230 through sides of the recesses 232 of the first lens plate 230 and radiated from a front surface of the first lens plate 230 without passing through the first lens portions 231. The reflector 236 is irradiated with the radiated light, so that the radiated light is reflected by surfaces of the respective parts of the reflector 236 so as to be converted into light going toward the light-extracting direction as shown in FIG. 21. Then, the reflected light is radiated out through a region 246 of the second lens plate 240 where the second lens portions 241 are not provided. As a result, the light radiated out through the region 246 surrounds the periphery of the light radiated out continuously through the first and second lens portions 231 and 241 and is radiated out as substantially parallel light beams in cooperation with the latter light.

In this manner, a part of light radiated from the chip type LEDs 220 is converted into substantially parallel light beams by the first and second lens portions 231 and 241 while the other part of light is converted into substantially parallel light beams by the reflector 236, so that substantially parallel light beams are radiated out as a whole. Because light emitted from the chip type LEDs 220 is radiated out in the predetermined manner, light having the flux of parallel rays is radiated from almost all of the light-emitting surface (the upper surface of the second lens plate 240) of the illumination device 201. Hence, for example, a book held in the occupant's hands can be illuminated by parallel light beams emitted from the illumination device 201. Because illumination can be performed by parallel light beams, both illuminance and region of illumination little change even in the case where the distance between the subject of illumination and the illumination device 201 more or less changes. Hence, if the illumination device 201 is used as a reading light by way of example, it is little necessary to adjust the position of the book in accordance with the change of the illumination region as well as it is little hard to read the book due to variation in illuminance in the case where the distance between the illumination device 201 and the book more or less changes in accordance with vibration or the like at the time of running of the vehicle. Hence, the illumination device 201 is very suitable as a reading light.

On the other hand, because two lens arrays, that is, the first lens portions 231 in the first lens plate 230 and the second lens portions 241 in the second lens plate 240 are used in combination in the illumination device 201, a high degree of light convergence can be obtained. In addition, because the reflector is further used in combination with the two lens arrays, the efficiency of light convergence can be enhanced more greatly. Hence, illumination very high in frontal illuminance can be performed.

Figure 22:
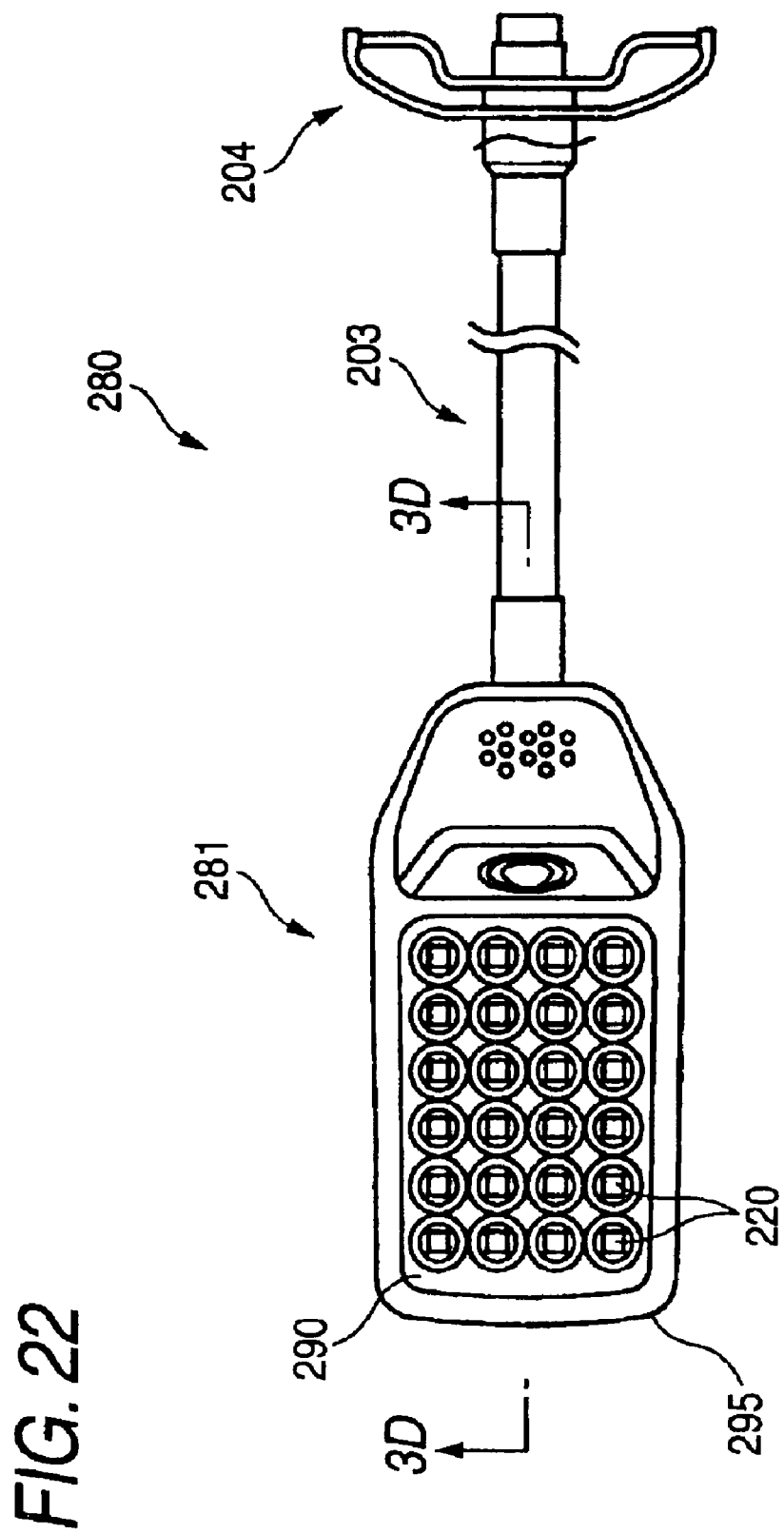
FIG. 22 is a plan view of a vehicle interior illumination device 280 according to a modification of this embodiment.
Figure 23:
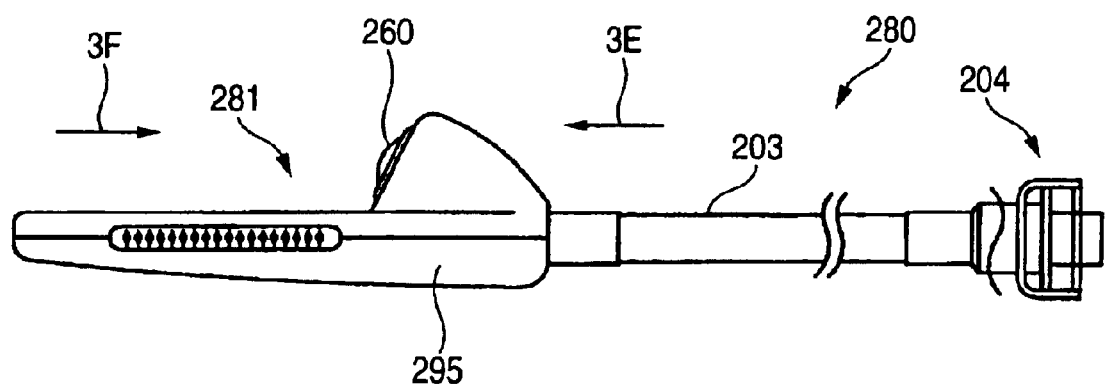
FIG. 23 is a side view of the vehicle interior illumination device 280.
Figure 24:
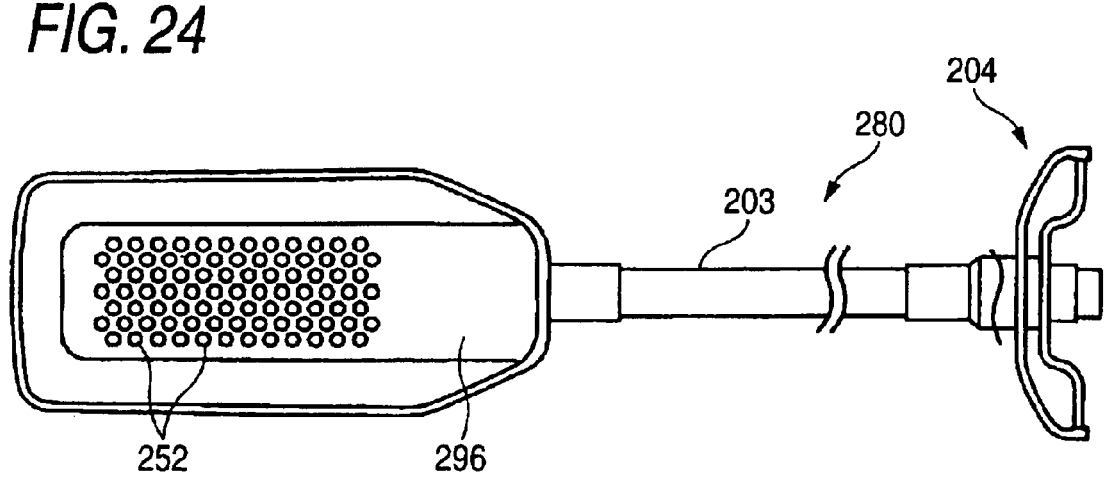
FIG. 24 is a partly back view of the vehicle interior illumination device 280 showing the configuration of the back of the illumination section 281.
Figure 28:
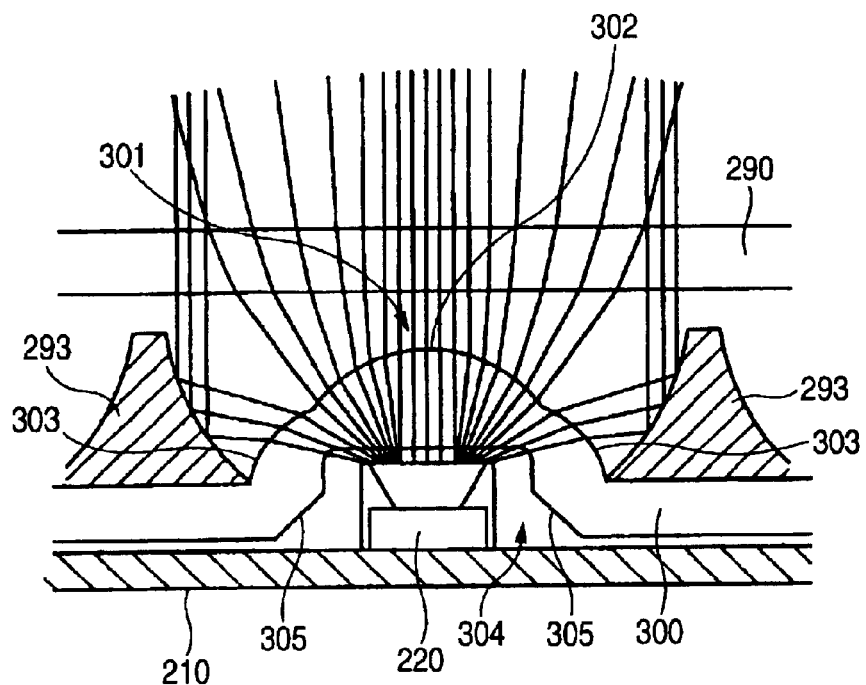
FIG. 28 is a partly enlarged view of FIG. 25, showing the configuration of the lens plate 300, the cover 290 and the reflector 293 and the form of radiation of light.

Next, a vehicle interior illumination device 280 (hereinafter referred to as "illumination device 280") which is a modification of the third embodiment will be described. FIG. 22 is a plan view of the illumination device 280. FIG. 23 is a side view of the illumination device 280. FIG. 24 is a partly back view of the illumination device 280. FIG. 25 is a sectional view taken along the line 3D—3D in FIG. 22. FIG. 26 is a plan view of the illumination device 280 from the arrow 3E in FIG. 23. FIG. 27 is a plan view of the illumination device 280 from the arrow 3F in FIG. 23. FIG. 28 is a partly enlarged view of the illumination device 280 depicted in FIG. 25. Incidentally, in the drawings, parts the same as those in the illumination device 201 are referred to by numerals the same as those in the illumination device 201 for the sake of omission of duplicated description.

The illumination device 280 is roughly constituted by an illumination section 281, an arm section 203, and an attachment section 204. The illumination section 281 has a board 210, chip type LEDs 220, a cover 290, and a lens plate 300. These members are received in a casing 295. Each of the chip type LEDs 220 is an LED which emits white light.

A plurality of holes 252 for radiating heat are provided in a bottom 296 of the casing 295. The arm section 203 is made of a flexible tube having a hollow portion through which wiring passes. The surface of the flexible tube is plated with chromium. The arm section 203 is connected to a central portion of one end side of the illumination section 281 through a bearing mechanism 297. Hence, the illumination section 281 can be rotated freely around the arm section 203 as a pivot and temporarily fixed at a desired angle.

Figure 29:
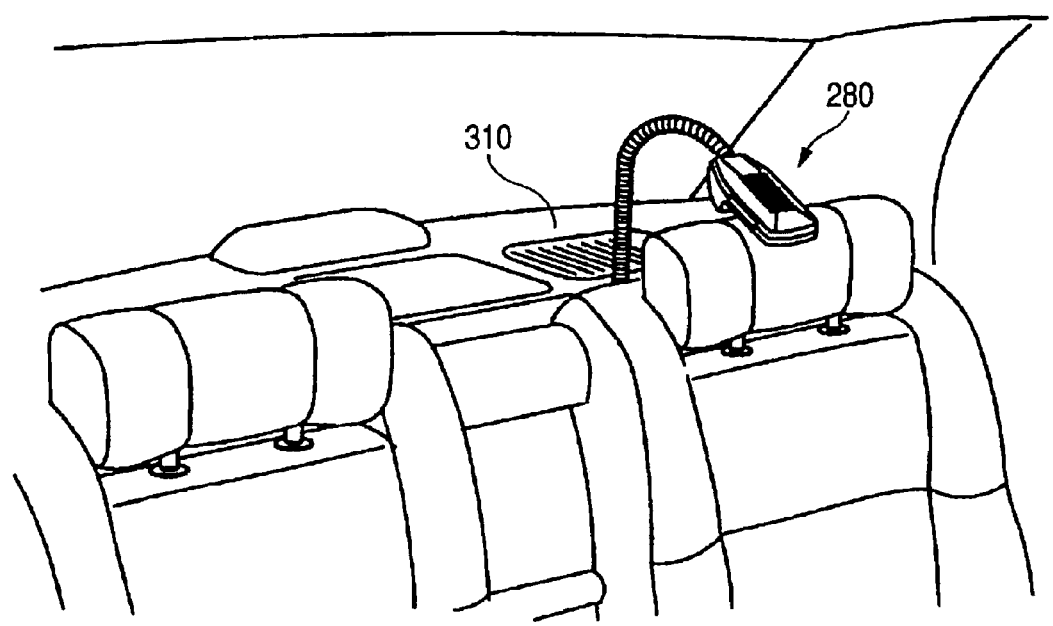
FIG. 29 is a perspective view showing an example of use of the vehicle interior illumination device 280.

In practical use of the illumination device 280, as shown in FIG. 29, the attachment section 204 is fixed to a rear package 310 of a car by bolts. In addition, the arm section 203 is bent suitable to adjust the position of the illumination section 281 and the direction of radiation of light.

Next, the configuration of the lens plate 300 and a reflector 293 and the form of radiation of light will be described with reference to FIG. 28 which is a partly enlarged view of FIG. 25.

The lens plate 300 is molded out of a light-transmissible resin (a polycarbonate resin in this modification of the embodiment). The lens plate 300 has a plurality of lens portions 301 formed at regular spaces. Each of the lens portions 301 has a surface shaped like a substantially reverse bowl. A central portion 302 of each of the lens portions 301 is molded to be protruded so as to be shaped like a convex lens. Further, a convex lens-shaped region is formed in a circumferential edge portion 303 of each lens portion 301 separately from the central portion 302. In this manner, a surface of each lens portion 301 is constituted by two convex lens-shaped surfaces jointed to each other.

The lens plate 300 is produced by a general forming method such as molding. Although this modification of the embodiment has shown the case where the shape of each lens portion 301 is designed so that the circumferential portion 303 of the lens portion 301 is entirely shaped like a convex lens, the invention may be also applied to the case where only a central portion 302 side region (e.g., a region continued to the central portion 302) of the circumferential portion 303 is shaped like a convex lens. In this case, the other region not shaped like a convex lens can be provided, for example, as a flat surface.

Recesses 304 are formed in surfaces of the lens portions 301 facing the chip type LEDs 220 respectively. The chip type LEDs 220 are disposed in the recesses 304 respectively. As shown in FIG. 28, a lower region 305 of each recess 304 is formed as a tapered surface which is widened so as to go away from the chip type LED 220. Because such a tapering process is applied to each recess 304, the space (air layer) between the chip type LED 220 and the lens plate 300 can be kept so large that heat can be efficiently radiated from the chip type LED 320. Incidentally, it is preferable that such a tapering process is applied only to a region of each recess 304 which is substantially not irradiated with light emitted from the chip type LED 320. This is because if such a tapering process is also applied to a region irradiated with light, it is necessary to design each lens portion 301 in consideration of light refraction by the tapered surface formed thus.

A surface of each lens portion 301 is entirely planished into a mirror surface. Hence, light can be efficiently radiated from the surface of each lens portion 301.

The lens plate 300 is disposed in parallel with the board 210 while the surface of the lens plate 300 in which the recesses 304 are formed faces downward so that the center of each of the lens portions 301 in plan view coincides with the center of corresponding one of the chip type LEDs 220 mounted on the board 210.

The light radiation side of the lens plate 300 is covered with the cover 290. The cover 290 is made of a light-transmissible resin (a polycarbonate resin in this modification of the embodiment) and prevents the inside of the illumination device 280 from being contaminated with dust or the like. In addition, the cover 290 contributes to improvement in design of the surface of the illumination device 280.

The reflector 293 is disposed between the lens plate 300 and the cover 290 so that each part of the reflector 293 is clamped between two adjacent lens portions 301. As a result, the reflector 293 is disposed so that the lens portions 301 are enclosed in the respective parts of the reflector 293. Each part of the reflector 293 has a metal surface plated with Ni. The surface of each part of the reflector 293 is curved like a bowl toward the light-extracting direction.

Next, the form of illumination by the illumination device 280 will be described. When the switch 260 is operated so that the chip type LEDs 220 are switched on, a wide range of light is emitted from the chip type LEDs 220. A large part of the light is led into the lens portions 301 through the bottoms of the recesses 304 of the lens plate 300. Of the light led into the lens portions 301, light reaching the central portions 302 of the lens portions 301 is converged by the lens effect of the lens portions 301 and then radiated from front surfaces of the central portions 302. Then, the radiated light is transmitted through the cover 290 and radiated out. On the other hand, of the light led into the lens portions 301, a part of light reaching the circumferential portions 303 of the lens portions 301 (light reaching the regions of the circumferential portions 303 near to the central portions 302) is refracted by the lens effect as shown in FIG. 28 and then reaches the cover 290 directly. Then, the light is transmitted through the cover 290 and radiated out. On the other hand, light reaching the regions of the circumferential portions 303 of the lens portions 301 far from the central portions 302 is refracted by the circumferential portions 303 and radiated as shown in FIG. 28. Then, the light is reflected by the surfaces of the respective parts of the reflector 293 so as to be converted into light going toward the light-extracting direction. Then, the light is transmitted through the cover 290 and radiated out. In this manner, the light radiated out through the circumferential portion 303 of each lens portion 301 surrounds the periphery of the light radiated out through the central portion 302 of the lens portion 301 and forms substantially parallel light beams in cooperation with the latter light.

According to the form of radiation of light, light having the flux of parallel rays is radiated from almost the whole light-emitting surface (the upper surface of the cover 290) of the illumination device 280. Hence, the book or the like held in the occupant's hands can be illuminated by parallel light beams emitted from the illumination device 280. Because illumination is performed by parallel light beams, both illuminance and region of illumination little change even in the case where the distance between the subject of illumination and the illumination device 280 more or less changes. Like the illumination device 201, the illumination device 280 is very suitable as a reading light. In addition, according to the form of radiation of light from the illumination device 280, the range of illumination by light caused by one chip type LED 220 is widened compared with the illumination device 201, so that the illumination device 280 can be constituted by a small number of LEDs.

The invention is not limited to the description of the embodiments at all. Various modifications that can be easily conceived by those skilled in the art may be included in the invention without departing from the description of the scope of Claims.

The following items are disclosed.

(11) An illumination device including:
 a plurality of LEDs;
 a first lens plate having a plurality of first lens portions formed in regions in which light beams emitted from the LEDs are led respectively; and
 a second lens plate having a plurality of second lens portions formed in regions in which light beams radiated through the first lens portions are led respectively.

(12) An illumination device according to the item (11), wherein the plurality of LEDs are arranged as a matrix on a board.

(13) An illumination device according to the item (11) or (12), further including a reflector by which light emitted laterally from the LEDs is reflected toward the light-extracting direction.

(14) An illumination device according to the item (13), wherein the reflector is disposed between the first lens plate and the second lens plate.

(15) An illumination device according to any one of the items (11) through (14), wherein the first lens portions have recesses respectively formed on the LED side so that the LEDs are disposed in the recesses respectively.

(16) An illumination device according to any one of the items (11) through (15), wherein each of the LEDs is a chip type LED.

What is claimed is:

1. An illumination device disposed in a roof portion of an interior of a vehicle, comprising:
 a first light-emitting section including a first light source comprising a plurality of first LEDs disposed at substantially regular spaces, and a first outer lens; and
 a second light-emitting section including a second light source comprising a second LED, and a second outer lens with which a light emission side of said second light source is covered and by which light emitted from said second light source is converged and radiated out.

2. An illumination device according to claim 1, wherein said first light-emitting section further includes said first outer lens with which a light emission side of said first light source is covered; and
 said first outer lens includes a recess on the first light source side so that said plurality of first LEDs are disposed so as to be enclosed in said recess.

3. An illumination device according to claim 2, wherein a plurality of recesses equal in number to said first LEDs are formed in place of the single recess so that said plurality of first LEDs are disposed so as to be enclosed in said recesses respectively.

4. An illumination device according to claim 1, wherein said first LEDs are disposed linearly when viewed from a light emission observation plane side.

5. An illumination device according to claim 2, wherein said first LEDs are disposed linearly when viewed from a light emission observation plane side.

6. An illumination device according to claim 3, wherein said first LEDs are disposed linearly when viewed from a light emission observation plane side.

7. An illumination device according to claim 1, wherein said second light-emitting section comprises a plurality of second light-emitting sections.

8. An illumination device according to claim 2, wherein said plurality of first LEDs contain at least two LEDs so that respective light beams emitted from said at least two LEDs are radiated out through said first outer lens and illuminate substantially one region.

9. An illumination device according to claim 2, wherein respective light beams emitted from said plurality of first LEDs are radiated out through said first outer lens and illuminate substantially one region.

10. An illumination device according to claim 8, further comprising a control unit for selecting at least one of a state in which all of said plurality of first LEDs are switched on and a state in which a portion of said plurality of first LEDs are switched on.

11. An illumination device according to claim 9, further comprising a control unit for selecting at least one of a state in which all of said plurality of first LEDs are switched on and a state in which a portion of said plurality of first LEDs are switched on.

12. An illumination device according to claim 2, wherein light beams radiated out through said first outer lens illuminate a substantially elliptical region.

13. An illumination device according to claim 1, further comprising a plurality of LED light sources which are disposed so that light beams emitted from said LED light sources illuminate specific areas respectively.

14. An illumination device according to claim 13, wherein said plurality of LED light sources include LED light sources for illuminating at least one of a driver's seat, a passenger seat, and rear seats, respectively.

15. An illumination device according to claim 13, wherein said plurality of LED light sources illuminate an area located between seats.

16. An illumination device according to claim 13, further comprising lenses which are disposed on the light emission side of at least a portion of said plurality of LED light sources so that a distance between each lens and corresponding one of said LED light sources can be changed.

17. An illumination device according to claim 14, further comprising lenses which are disposed on the light emission side of at least a portion of said plurality of LED light sources so that a distance between each lens and corresponding one of said LED light sources can be changed.

18. An illumination device according to claim 15, further comprising lenses which are disposed on the light emission side of at least a portion of said plurality of LED light sources so that a distance between each lens and corresponding one of said LED light sources can be changed.

19. An illumination device according to claim 13, wherein said plurality of LED light sources are arranged as a matrix viewed from a design surface side.

20. An illumination device according to claim 13, wherein said plurality of LED light sources include at least two kinds of LED light sources for emitting light beams of different colors.

21. An illumination device according to claim 7, wherein at least one of said plurality of second light-emitting sections is disposed in a corner of said illumination device.

22. An illumination device according to claim 7,
 wherein said illumination device further comprises a cover covering at least said plurality of second light-emitting sections,
 wherein said plurality of second light-emitting sections each include at least one LED, and
 wherein an optical axis of said at least one LED is inclined from a direction perpendicular to a surface of a cover of said illumination device.

23. An illumination device according to claim 7, wherein said plurality of second light-emitting sections each include at least one LED, wherein said at least one LED emits light in a direction inclined from a direction that is perpendicular to a light emitting surface of said second light-emitting section.

24. An illumination device according to claim 7, wherein said plurality of second light-emitting sections each include at least one LED, wherein an optical axis of said at least one LED is different than an optical axis of another of said at least one LED.

25. An illumination device according to claim 1, further comprising at least one lens disposed on the light emission side of said second light source, wherein said at least one lens is movable to change at least one of a direction of light emitted from said second light source, and a range of irradiation of said light emitted from said second light source.

26. An illumination device according to claim 7, wherein at least one of said plurality of second light-emitting sections further comprises at least one lens disposed on the light emission side of said at least one of said plurality of second light-emitting sections, wherein said at least one lens is movable to change at least one of a direction of light emitted from said second light source, and a range of irradiation of said light emitted from said second light source.

* * * * *